US011590951B2

(12) United States Patent
Van Thiel

(10) Patent No.: US 11,590,951 B2
(45) Date of Patent: Feb. 28, 2023

(54) ELECTROPNEUMATIC HANDBRAKE (EPH) WITH INTEGRATED TCV (SCANDINAVIAN ACTUATION)

(71) Applicant: WABCO GmbH, Hannover Niedersachsen (DE)

(72) Inventor: Julian Van Thiel, Grossburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 246 days.

(21) Appl. No.: 16/495,108

(22) PCT Filed: Mar. 20, 2018

(86) PCT No.: PCT/EP2018/056981
§ 371 (c)(1),
(2) Date: Sep. 18, 2019

(87) PCT Pub. No.: WO2018/172333
PCT Pub. Date: Sep. 27, 2018

(65) Prior Publication Data
US 2020/0139952 A1     May 7, 2020

(30) Foreign Application Priority Data

Mar. 21, 2017 (DE) ..................... 10 2017 002 714.5
Jun. 24, 2017 (DE) ..................... 10 2017 005 979.9

(51) Int. Cl.
*B60T 13/26* (2006.01)
*B60T 8/17* (2006.01)
(Continued)

(52) U.S. Cl.
CPC .......... *B60T 13/683* (2013.01); *B60T 8/1701* (2013.01); *B60T 13/263* (2013.01); *B60T 13/385* (2013.01);
(Continued)

(58) Field of Classification Search
CPC ...... B60T 13/385; B60T 13/58; B60T 13/683; B60T 8/342; B60T 8/343; B60T 8/3605; B60T 15/203; B60T 15/206
See application file for complete search history.

(56) References Cited

U.S. PATENT DOCUMENTS 6,206,481 B1    3/2001 Kaisers et al.
2004/0194832 A1* 10/2004 Kemer ................. B60T 17/085
137/596

(Continued)

FOREIGN PATENT DOCUMENTS

CN        2516409 Y    10/2002
CN      201026867 Y     2/2008
(Continued)

OTHER PUBLICATIONS

English machine translation of DE102015112490 (Year: 2017).*

*Primary Examiner* — Melody M Burch
(74) *Attorney, Agent, or Firm* — Leydig, Voit & Mayer, Ltd.

(57) ABSTRACT

An electropneumatic control module for an electronically controllable pneumatic brake system for a vehicle combination with a tractor vehicle and a trailer vehicle includes a pneumatic reservoir input, which is connectable to a compressed-air reservoir, a trailer control unit, which has a trailer control valve unit with one or more electropneumatic valves, a trailer brake pressure port and a trailer supply pressure port, an immobilizing brake unit, which has a spring-type actuator port for a spring-type actuator for a tractor vehicle and an immobilizing brake valve unit with one or more electropneumatic valves, and an electronic control unit for controlling the trailer control valve unit and the immobilizing brake valve unit. The trailer control unit has a first relay valve, which has a relay valve working input
(Continued)

connected to the reservoir input, a relay valve output connected to the trailer brake pressure port, and a relay valve ventilation output.

26 Claims, 7 Drawing Sheets

(51) Int. Cl.
    *B60T 13/68*     (2006.01)
    *B60T 13/38*     (2006.01)

(52) U.S. Cl.
    CPC ..... *B60T 2270/10* (2013.01); *B60T 2270/402* (2013.01); *B60T 2270/413* (2013.01)

(56) References Cited

U.S. PATENT DOCUMENTS

| | | | |
|---|---|---|---|
| 2006/0226698 A1* | 10/2006 | Riebe | B60T 8/1703 |
| | | | 303/20 |
| 2007/0270006 A1 | 11/2007 | Herges | |
| 2008/0202871 A1* | 8/2008 | Battistella | B60T 15/041 |
| | | | 188/170 |
| 2010/0187902 A1* | 7/2010 | Bensch | B60T 13/683 |
| | | | 303/127 |
| 2010/0237690 A1 | 9/2010 | Foerster et al. | |
| 2011/0144855 A1 | 6/2011 | Herges et al. | |
| 2015/0094906 A1* | 4/2015 | Greene | B60T 13/263 |
| | | | 701/33.9 |
| 2015/0239441 A1* | 8/2015 | Klostermann | B60T 15/028 |
| | | | 303/7 |
| 2016/0082939 A1* | 3/2016 | Cole | B60T 15/021 |
| | | | 303/8 |
| 2019/0337503 A1* | 11/2019 | Otremba | B60T 13/662 |

FOREIGN PATENT DOCUMENTS

| | | | | |
|---|---|---|---|---|
| CN | 102706505 A | * | 10/2012 | |
| CN | 105324284 A | | 2/2016 | |
| DE | 19609222 A1 | | 9/1997 | |
| DE | 102004051309 B4 | | 8/2006 | |
| DE | 102007047691 A1 | | 4/2009 | |
| DE | 102008014458 A1 | | 9/2009 | |
| DE | 102008029310 A1 | | 1/2010 | |
| DE | 102012000435 A1 | | 7/2013 | |
| DE | 102016003034 A1 | | 9/2016 | |
| DE | 102015112490 A1 | | 2/2017 | |
| DE | 102015011296 A1 | * | 3/2017 | ............. B60T 13/26 |
| EP | 1022204 A2 | | 7/2000 | |
| EP | 1780087 A1 | | 5/2007 | |

\* cited by examiner

ELECTROPNEUMATIC HANDBRAKE (EPH) WITH INTEGRATED TCV (SCANDINAVIAN ACTUATION)

CROSS REFERENCE TO RELATED APPLICATIONS

This application is a U.S. National Phase Application under 35 U.S.C. § 371 of International Application No. PCT/EP2018/056981, filed on Mar. 20, 2018, and claims benefit to German Patent Application No. DE 10 2017 002 714.5, filed on Mar. 21, 2017, and No. DE 10 2017 005 979.9, filed on Jun. 24, 2017. The International Application was published in German on Sep. 27, 2018, as WO 2018/172333 under PCT Article 21(2).

FIELD

The invention relates to an electropneumatic control module for an electronically controllable pneumatic brake system for a vehicle combination with a tractor vehicle and a trailer vehicle, having: a pneumatic reservoir input, which is connectable to a compressed-air reservoir, having a trailer control unit, which has a trailer control valve unit with one or more electropneumatic valves, a trailer brake pressure port and a trailer supply pressure port, having an immobilizing brake unit, which has a spring-type actuator port for a spring-type actuator for a tractor vehicle and an immobilizing brake valve unit with one or more electropneumatic valves, and having an electronic control unit for controlling the trailer control valve unit and the immobilizing brake valve unit, wherein the trailer control valve unit has a first relay valve, which has a relay valve working input connected to the reservoir input, a relay valve output connected to the trailer brake pressure port, and a relay valve ventilation output, via which the relay valve output is connectable to a pressure sink. The invention furthermore relates to a tractor vehicle having such an electropneumatic control module.

BACKGROUND

In vehicles, in particular utility vehicles, having a pneumatic brake system formed in particular as an electronic brake system (EBS) or anti-lock system (ABS), for the outputting of brake pressures, electropneumatic valves, for example relay valves or axle modulators, can be activated by a control unit (ECU), which electropneumatic valves then, in a manner dependent on a demanded vehicle target deceleration, pneumatically transmit a brake pressure to the brake cylinders of service brakes of the brake system.

In brake systems for a vehicle combination, the brake system has a trailer control unit, also referred to as Trailer Control Valve (TCV), which is provided for also providing a pneumatic output, correspondingly to the vehicle target decelerations predefined by the tractor vehicle, via ports, specifically a trailer brake pressure port and a trailer supply pressure port, which are also referred to as yellow and red coupling head. Via the trailer supply pressure port, the trailer vehicle is provided with a supply pressure from a reservoir, provided for that purpose, of the tractor vehicle, whereas the corresponding brake pressure is output via the trailer brake pressure port.

As a further component or module, brake systems of the above generic type have an immobilizing brake unit, also referred to as electropneumatic handbrake (EPH). Such immobilizing brake units are commonly operated with so-called spring-type actuators, that is to say brake devices which brake one or more axles of the tractor vehicle owing to a spring force. In the aerated state, the brakes are released, and in the ventilated state, they are braked. In an unpressurized state, the corresponding vehicle is thus braked. For the activation of the immobilizing brake unit, an electrical switch is generally provided in the driver's cab of the tractor vehicle, by means of which switch a corresponding signal can be output to an electronic control unit, which then switches one or more electropneumatic valves such that the spring-type actuators are either ventilated or aerated.

The immobilizing brake unit, that is to say the electropneumatic handbrake, is used for parking the vehicle combination, but also as an auxiliary brake in particular situations. That is to say, aside from the normal service brakes, the spring-type actuators are at least partially ventilated in order to use these additionally or alternatively for braking purposes. Here, to pneumatically output a corresponding brake signal for the trailer vehicle also, use is generally made of a so-called inverse relay valve which outputs a rising pressure on the basis of a falling pressure in the spring-type actuators. Such inverse relay valves are of complex construction and have multiple control pistons which interact with one another by way of various control surfaces and various control chambers. Thus, for example during purely service braking operations, braking is performed exclusively by means of spring-type actuators in the tractor vehicle and service brakes in the trailer vehicle. The service brakes in the tractor vehicle are not actuated during purely service braking operations. Alternatively, a redundancy mode may also be implemented, in which, for example in the event of a circuit failure at the rear axle, the spring-type actuators are used for assistance as an alternative to the service brakes. The front axle can continue to be braked by means of service brakes, and the trailer vehicle likewise by means of service brakes.

Furthermore, in brake systems of the type mentioned in the introduction, a distinction is made between so-called "European trailer control" and "Scandinavian trailer control". Whereas it is the case in "European trailer control" that, in the parked state of the vehicle combination, a positive brake pressure corresponding to the ventilated spring-type actuators is output at the trailer vehicle in order to additionally brake the latter, the opposite is the case in "Scandinavian trailer control": In the parked state of the vehicle combination, the service brakes of the trailer vehicle should be released. This means that, in the case of "European trailer control", it is necessary in the parked state of the vehicle combination, that is to say in the electrically deenergized state, for a positive brake pressure to be permanently output by means of the trailer control unit (TCV) to the service brakes of the trailer vehicle.

Since it is thus the case in practice that the trailer control unit (TCV) and the immobilizing brake unit (EPH) interact, an integration of these two modules has proven to be desirable. A first approach for the integration is disclosed for example in DE 10 2016 003 034 A1. Whereas the immobilizing brake unit (EPH) has previously commonly been integrated into a compressed-air treatment unit, DE 10 2016 003 034 A1 discloses integrating the immobilizing brake unit (EPH) into the trailer control unit (TCV). This supposedly promotes a particularly simple integration of the electropneumatic components into the vehicle. A corresponding situation supposedly applies if the control device is at least partially integrated in a trailer device of said type.

Similarly, DE 10 2008 014 458 A1 from this applicant also proposes an electropneumatic device, in particular an air treatment device, an axle modulator, a trailer control valve, a control device of an electronic brake system or a vehicle dynamics control device, and/or an electropneumatic device of the vehicle, in particular an air treatment device or an air suspension device with an immobilizing brake function integrated therein.

A practical embodiment for "Scandinavian trailer control" is disclosed in DE 10 2015 112 490 A1. Said document discloses an electropneumatic control module according to the preamble of claim 1. The electropneumatic control module has a common control unit (ECU) both for an immobilizing brake unit (EPH) and for a trailer control unit (TCV). Specifically, DE 10 2015 112 490 A1 has disclosed an electropneumatic control device of an electropneumatic brake system of a tractor vehicle-trailer combination at least for controlling the immobilizing braking of the tractor vehicle-trailer combination and the auxiliary braking of the tractor vehicle-trailer combination and the service braking at least of the trailer, having at least one housing, in or on which the following is arranged: a) a pneumatic control input port for a control line which leads to a pneumatic channel of a service brake actuating device of the tractor vehicle, b) a pneumatic supply port for a supply line which leads to at least one compressed-air reservoir of the tractor vehicle, c) a pneumatic control output port for a service line which leads to a "brake" coupling head of the tractor vehicle, d) a pneumatic supply output port for a supply line which leads to a "reservoir" coupling head of the tractor vehicle, e) an immobilizing brake output port for a brake line which leads to a spring-type actuator brake cylinder of the tractor vehicle, f) an electric immobilizing brake control port for a control line which leads to an electric immobilizing brake actuating device, g) an electric service brake control port for a signal line which leads to an electrical channel of the service brake actuating device, h) a first relay valve having a control input, a first working output and a supply input, wherein the first working output is connected to the immobilizing brake output port and the supply input is connected to the supply input port, i) an electronic control unit, j) a first electromagnetic inlet/outlet valve combination which is controlled by the electronic control unit and which shuts off the control input of the first relay valve, connects said control input to a compressed-air sink or connects said control input to the pneumatic supply port, k) a second relay valve having a pneumatic supply input, which is connected to the supply input port, a pneumatic supply output, which is connected to the supply output port, a second working output, which is connected to the control output port and having a first pneumatic control input and a second pneumatic control input, l) an electromagnetic valve device which is controlled by the electronic control unit and which has a second electromagnetic inlet/outlet valve combination and an electromagnetic backup valve, wherein the backup valve, in the electrically deenergized state, connects the control input port to the first pneumatic control input of the second relay valve and, when electrically energized, shuts off said connection, and wherein the second electromagnetic inlet/outlet valve combination shuts off a second pneumatic control input of the second relay valve, connects said second pneumatic control input to a compressed-air sink or connects said second pneumatic control input to the pneumatic supply input port, wherein m) the second relay valve comprises two control pistons, a first control piston which delimits a first control chamber connected to the first pneumatic control input, and a second control piston which delimits a second control chamber connected to the second pneumatic control input, wherein the first control piston and the second control piston interact with a double-seat valve which has an inlet valve and an outlet valve for the aeration or ventilation of the second working output. By means of an electromagnetic valve device, the two control pistons of the second relay valve can be controlled such that, firstly, by means of the first control piston, service braking of the trailer and auxiliary braking is performed, if the spring-type actuators of the tractor vehicle are used for braking. The second control piston is used for a redundancy situation, if the vehicle driver outputs a redundancy pressure manually by means of a brake pedal. "European trailer control" such that the trailer is braked by means of a brake pressure by means of the service brakes in the electrically deenergized state of the vehicle with ventilated spring-type actuators is not possible, and is explicitly not provided for either, in the configuration from DE 10 2015 112 490 A1. Furthermore, the construction of the relay valve with two control pistons in one relay valve is complex.

Furthermore, DE 10 2012 000 435 A1 from this applicant has disclosed an immobilizing brake module for "European trailer control". The module disclosed in said document utilizes a relay valve and a first and a second bistable valve in order to be able to output the corresponding brake pressure for the service brakes of the trailer even in the electrically deenergized state with ventilated spring-type actuators.

Furthermore, DE 10 2004 051 309 B4 has disclosed an electropneumatic central unit of the utility vehicle constructed from modules with electrical and/or pneumatic components. The central unit may be assembled from individual modules in order to realize corresponding functionalities. The individual modules have electrical connections and pneumatic ports which correspond to one another.

DE 10 2007 047 691 A1 discloses an immobilizing brake modulator, by means of which service braking of the trailer can be activated in correspondence with spring-type actuators of the tractor vehicle. The immobilizing brake modulator has a tractor vehicle protection valve which is designed such that, in the event of a pressure drop of the reservoir pressure for the trailer, the control pressure line is also shut off.

SUMMARY

In an embodiment, the present invention provides an electropneumatic control module for an electronically controllable pneumatic brake system for a vehicle combination with a tractor vehicle and a trailer vehicle. The electropneumatic control module includes a pneumatic reservoir input, which is connectable to a compressed-air reservoir, a trailer control unit, which has a trailer control valve unit with one or more electropneumatic valves, a trailer brake pressure port and a trailer supply pressure port, an immobilizing brake unit, which has a spring-type actuator port for a spring-type actuator for a tractor vehicle and an immobilizing brake valve unit with one or more electropneumatic valves, and an electronic control unit for controlling the trailer control valve unit and the immobilizing brake valve unit. The trailer control unit has a first relay valve, which has a relay valve working input connected to the reservoir input, a relay valve output connected to the trailer brake pressure port, and a relay valve ventilation output, via which the relay valve output is connectable to a pressure sink. The first relay valve has a relay valve control input, which opens into a common control chamber. The relay valve control input is connectable by the trailer control valve unit to the reservoir input and/or to a ventilation means in order to output a service brake control pressure in the common control chamber, and wherein, in the event of a fault of the electropneumatic control module, a redundancy pressure can be output into the common control chamber in order to output a brake pressure at the trailer brake pressure port.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
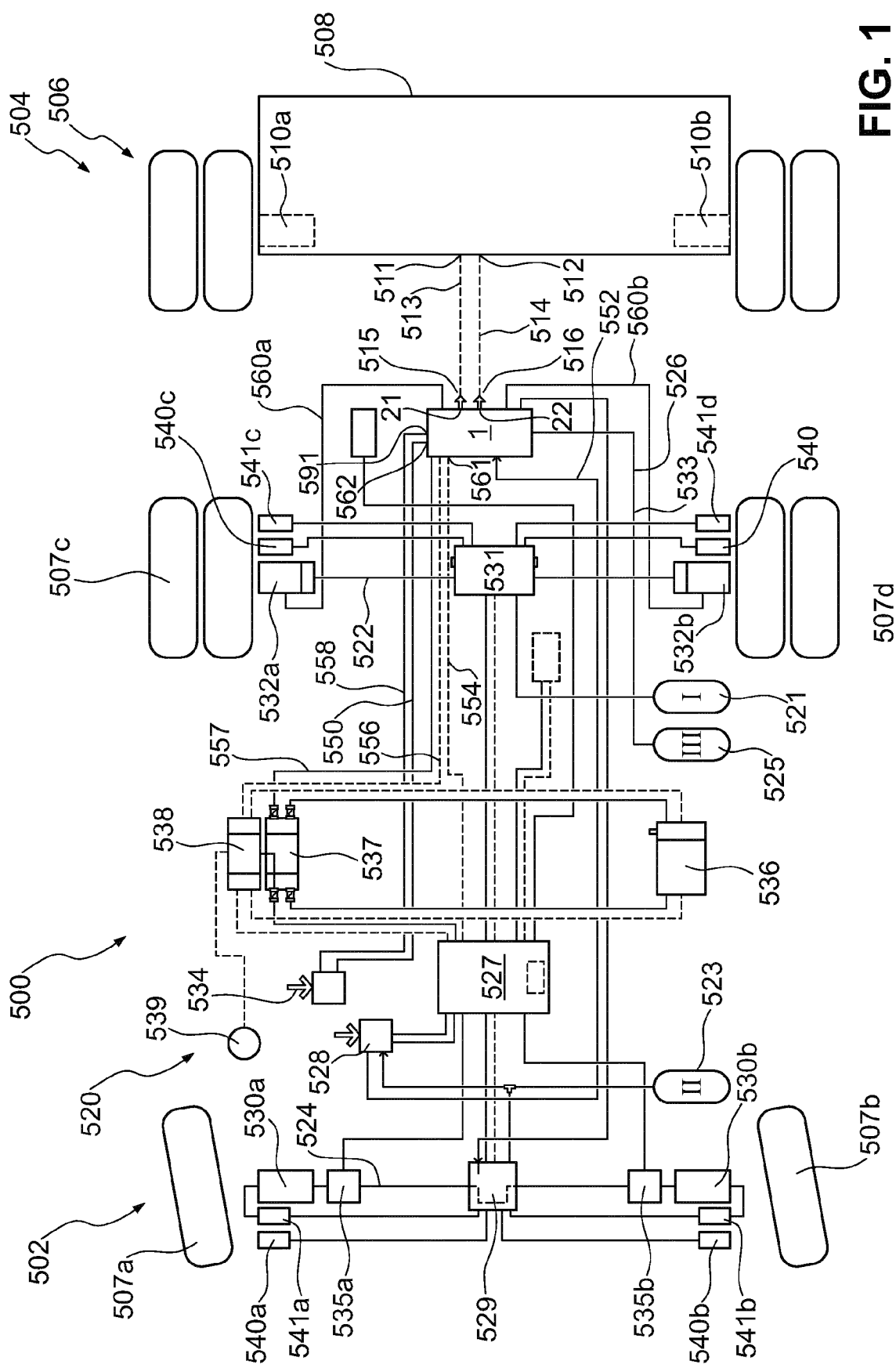
FIG. 1 shows a schematic overall layout of a brake system for a vehicle combination with an electropneumatic control module according to an embodiment of the invention.

Embodiments of the present invention specify an electropneumatic control module of the type mentioned in the introduction which, in relation to the prior art, is simplified and less susceptible to faults but can nevertheless implement at least the same functionalities. Embodiments of the invention specify an electropneumatic control module for "Scandinavian trailer control".

According to embodiments of the invention, an electropneumatic control module is provided in which the first relay valve has a relay valve control input, which opens into a common control chamber, wherein the relay valve control input is connectable by means of the trailer control valve unit to the reservoir input and/or to a ventilation means in order to output a service brake control pressure in the common control chamber, and wherein, in the event of a fault of the electropneumatic control module, a redundancy pressure can be output into the common control chamber in order to output a brake pressure at the trailer brake pressure port.

The invention has recognized that, to realize the "Scandinavian trailer control", it is not necessary to use a complex inverse relay valve or a complex relay valve with two control pistons and two control chambers. Rather, it is sufficient, even in the case of an integrated electropneumatic control module, which integrates an immobilizing brake unit and a trailer control unit in one device with a common electronic control unit, to use a simple relay valve with a common control chamber for the service brake control pressure and the redundancy pressure. Both pressures are output into the same control chamber. In this way, the construction is greatly simplified, because firstly, fewer components are used, and secondly, the interaction of multiple pistons is also not necessary. Furthermore, the installation space is reduced, and the susceptibility to faults is also lower owing to the reduced complexity. The first relay valve preferably has a single control chamber.

Here, the service brake control pressure is the pressure that is automatically output during normal driving operation in order to effect a corresponding trailer brake pressure. The redundancy pressure is preferably output in a fault situation, for example by means of an (electro)pneumatic brake transducer (brake pedal). The redundancy pressure may however also be provided by another control module. According to embodiments of the invention, said pressure is also output into the common control chamber in order to effect the outputting of a corresponding trailer brake pressure.

According to embodiments of the invention, electropneumatic control modules are provided, in particular, for a vehicle combination with a utility vehicle. The trailer supply pressure port serves for being connected to a "reservoir" port, also known as "red coupling head", of the tractor vehicle. Correspondingly, the trailer brake pressure port is provided for being connected to a "brake" port, also known as "yellow coupling head", of the tractor vehicle.

In a preferred embodiment, the first relay valve has a single control piston. The common control chamber is consequently defined by the single control piston and, in the event of a pressure being output into the common control chamber, the single control piston is moved. The construction of a relay valve of said type is thus conceivably straightforward, and leads to a simple electropneumatic control module which exhibits low susceptibility to faults and which is inexpensive to produce.

Said single control piston of the first relay valve preferably has a single control surface. It is furthermore preferable for the first relay valve to have a single relay valve control input. It is conceivable and preferable for one or more pneumatic lines to be connected to said relay valve control input, such that it is possible, by means of one or more pneumatic valves, for one or more different pressures to be output at the single relay valve control input. Through the provision of a single relay valve control input, however, the construction is further simplified, and the susceptibility to faults is reduced. Leakage is substantially prevented, and connecting points are reduced.

In a further preferred refinement of the invention, the trailer control valve unit has an electronically switchable inlet valve with at least one first and one second inlet valve port, wherein the first inlet valve port is connected to the reservoir input, and the second inlet valve port is connected to the control chamber of the first relay valve, in order to aerate the control chamber through switching of the inlet valve. The inlet valve is preferably designed as a 2/2 directional valve. Alternatively, the inlet valve is integrated with at least one further switching valve, and designed for example as a 3/2 directional valve.

In a further preferred embodiment, the electropneumatic control module has a redundancy pressure port with a first redundancy pressure line for the connection of a brake transducer or of the brake or control pressure of one of the other vehicle axles, via which redundancy pressure port, for example by means of actuation of a pedal, a pneumatic brake pressure can be output at the trailer brake pressure port. The brake transducer may be of purely pneumatic, electropneumatic or any other form. The redundancy pressure port serves for receiving a vehicle target deceleration of a vehicle driver, who inputs this manually by means of the brake transducer. The vehicle driver can thus, in a fault situation, for example in the event of failure of the supply voltage, output a brake pressure purely pneumatically. Alternatively, a brake or control pressure of another vehicle axle, for example of the front axle, is output at the redundancy port. In this way, it is then possible in the fault situation for the trailer vehicle to be braked correspondingly to the other axle.

In a further preferred refinement, the trailer control valve unit has an electronically switchable redundancy valve with at least one first and one second redundancy valve port, wherein the first redundancy valve port is connected to the redundancy pressure port, and the second redundancy valve port is connected via a second redundancy pressure line to the control chamber of the first relay valve, in order to output a redundancy pressure in the control chamber through switching of the redundancy valve. The first redundancy valve port is preferably connected via the first redundancy pressure line to the redundancy pressure port. The redundancy valve is preferably designed as a 2/2 directional valve. Alternatively, it is integrated with at least one further valve, such as in particular the inlet valve, and formed jointly as a 3/2 directional valve. The redundancy valve may also be referred to as a type of input valve, because it opens up or shuts off the pressure input from the brake transducer via the redundancy pressure port.

In a further preferred embodiment, the trailer control valve unit has an electronically switchable outlet valve with at least one first and one second outlet valve port, wherein the first outlet valve port is connected to the control chamber of the first relay valve, and the second outlet valve port is connected to a pressure sink, in order to ventilate the control chamber through switching of the outlet valve. The outlet valve is preferably designed as a 2/2 directional valve. Alternatively, it is integrated with at least one further valve, in particular the inlet valve, and formed as a 3/2 directional valve. If a brake pressure has been output at the relay valve output, and if it is sought to reduce said brake pressure, the control chamber can be ventilated via the outlet valve by virtue of the outlet valve being moved from a first, closed switching position into a second, opened switching position.

In a further preferred embodiment, the redundancy valve is designed as a 3/2 directional valve and has a third redundancy valve port, wherein the third redundancy valve port is connected to a pressure sink. In this case, an outlet valve can be omitted. The redundancy valve and the outlet valve are in this case integrated, and the redundancy valve serves not only for outputting a redundancy pressure at the relay valve control input, but also for ventilating the control chamber for the situation in which it is sought to reduce the brake pressure that is output at the relay valve output. This is expedient because, during normal operation, it is normally the case that no redundancy pressure is output, but rather the brakes are electronically activated by the control unit or a superordinate control unit, for example a central module. Furthermore, outlet valve and redundancy valve may be integrated, because, for the situation in which it is sought to output a redundancy pressure, the outlet valve must be closed in any case. In this way, installation space can be further reduced, and components can be omitted.

In a further preferred embodiment, the second redundancy pressure line is connected to the first inlet valve port, such that, in a first switching position of the redundancy valve, in the case of an open inlet valve, a redundancy pressure can be output from the redundancy pressure port, via the redundancy valve and the inlet valve into the control chamber, and in a second switching position of the redundancy valve, a control pressure can be output from the reservoir input, via the redundancy valve and the inlet valve into the control chamber. In this case, the redundancy valve is preferably designed as a 3/2 directional valve, whereas the inlet valve is designed as a 2/2 directional valve. The redundancy valve is preferably connected upstream of the inlet valve, and the first redundancy valve port is connected to the first redundancy pressure line, and the second redundancy valve port is connected to the second redundancy pressure line, which in turn is connected to the first inlet valve port. The third redundancy valve port is connected to the reservoir input. In this embodiment, the redundancy valve can switch back and forth between redundancy pressure and reservoir pressure, and the inlet valve can be used to respectively shut off the pressure output from the redundancy valve or transmit said pressure onward to the relay valve control input. In this way, overloading or overbraking is avoided, because always only either the redundancy pressure or the reservoir pressure can act at the inlet valve, more specifically in the first inlet valve port.

In a further preferred embodiment, the electronic control unit ECU is designed to (1.), on the basis of a first electronic auxiliary brake signal, trigger the immobilizing brake valve unit to switch at least one valve of the immobilizing brake valve unit such that a working pressure for the temporary and stepped ventilation of the at least one spring-type actuator is output at the spring-type actuator port; and (2.), on the basis of the first electronic auxiliary brake signal or a second auxiliary brake signal, trigger the trailer control valve unit to switch at least one valve, preferably the inlet valve and/or the redundancy valve, of the trailer control valve unit such that a brake pressure is output at the trailer brake pressure port. If the spring-type actuators, which serve primarily as immobilizing brakes or parking brakes, are also to be used for auxiliary braking during travel, one or more valves of the immobilizing brake valve unit are switched by the electronic control unit on the basis of a received or determined first electronic auxiliary brake signal such that the spring-type actuators are correspondingly partially ventilated and/or aerated. In order, in this situation, to also actuate the service brakes of the trailer vehicle, the electronic control unit is preferably likewise configured to, on the basis of the first electronic auxiliary brake signal or a second auxiliary brake signal, if a second auxiliary brake signal which is provided for trailer vehicles is received or determined, trigger at least one valve of the trailer control valve unit to switch such that a brake pressure is output at the trailer brake pressure port. The brake pressure output at the trailer brake pressure port is preferably equivalent to the aeration and/or ventilation of the spring-type actuators, such that the tractor vehicle and the trailer vehicle are braked correspondingly. In this variant, auxiliary brake functionality is implemented, whereby the vehicle combination is made safer.

Auxiliary brake functionality or auxiliary brake mode refers to the outputting of a brake pressure in driving situations in which it is sought for the immobilizing brake to be (partially) engaged and the vehicle is not at a standstill. That is to say, in the present case, an auxiliary brake function encompasses not only the case of failure of the service brake system but also the case of the immobilizing brakes being used additionally or alternatively to the service brakes for any reason.

The first electronic auxiliary brake signal, and preferably the second electronic auxiliary brake signal, in the event that a second electronic auxiliary brake signal exists, is preferably provided either by an operator control element (for example handbrake switch), by a central unit or by a superordinate control unit (for example a control unit for autonomous driving). This first electronic auxiliary brake signal is transmitted for example via a CAN bus or LIN bus.

In a further preferred embodiment, the electronic control unit, the trailer control unit and the immobilizing brake unit are integrated in one module. In this context, "integrated in one module" is also to be understood to mean a situation in which the individual components, that is to say the electronic control unit, the trailer control unit and/or the immobilizing brake unit are formed as sub-modules which are flange-mounted onto one another. These components, specifically at least the electronic control unit, the trailer control unit and the immobilizing brake unit, are preferably arranged in a common housing. In this way, in particular, the assembly and also the retroactive installation of an electropneumatic control module according to the invention are greatly simplified. The control unit serves for controlling both the trailer control unit and the immobilizing brake unit and is locally integrated with these in one housing. For this purpose, it is then merely necessary, instead of separate analog pilot-control lines, which lead directly from the central module to the trailer control valve unit, for one electrical connection, for example one CAN bus connection, to be provided on the housing, along with the corresponding pneumatic ports. In this way, the susceptibility to faults is greatly reduced, because external interfaces are reduced.

It is preferable if not an inverse relay valve but a "normal" relay valve is provided in the electropneumatic control module. It is thus also possible to omit a further shut-off valve which otherwise serves, in the parking situation, to prevent a brake pressure being output at the trailer brake pressure port ("Scandinavian trailer control"). Through the omission of the inverse relay valve, the installation space of the electropneumatic control module as a whole is reduced, and the complexity of the relay valve also decreases, whereby costs are reduced, and the susceptibility to faults is also lower. Furthermore, a further electropneumatic valve in the immobilizing brake unit (EPH), such as has been used in the prior art for the "trailer monitoring position", can be omitted.

In a further preferred embodiment, the electropneumatic control module has a connection for receiving a redundant electronic brake representation signal, wherein the electropneumatic control module is designed to switch at least one valve of the trailer control valve unit in a manner dependent on the received redundant electronic brake representation signal such that a corresponding brake pressure is output at the trailer brake pressure port. The brake representation signal may comprise or take the form of a brake signal. It may however also be a signal which merely represents a brake signal, for example a signal of a sensor which detects braking of a further service or immobilizing brake. Such a signal is not directly a brake signal but represents a brake signal, and can be regarded as a derived signal.

The redundant electronic brake representation signal is provided for example by a manually actuated brake transducer and/or a handbrake switch. During normal operation, an electronic brake signal (as brake representation signal) is provided by a further control unit, for example a central module. If said further control unit fails, the electropneumatic control module according to this embodiment is configured to receive and use a redundant electronic brake representation signal. The brake transducer may be formed for example as a brake pedal which operates electromechanically and in the case of which a travel transducer provides a corresponding electrical signal on the basis of the pedal travel.

The brake representation signal preferably represents the actuation of an immobilizing brake of the tractor vehicle. For example, the brake representation signal in this case takes the form of a signal of an electrical handbrake switch or a signal of a sensor which detects the actuation of an immobilizing brake, in particular spring-type actuator, of the tractor vehicle.

Here, provision is preferably made for the electropneumatic control module to have a redundant pressure sensor which is arranged on the first redundancy pressure line or at the redundancy pressure port and which is designed to detect the pneumatic redundancy pressure at the redundancy pressure port or in the first redundancy pressure line and to provide a corresponding redundancy pressure signal as the brake representation signal to the control unit. The redundancy pressure signal provided by the redundant pressure sensor represents a driver demand, because the pressure sensor directly or indirectly detects the redundancy pressure output manually by means of the brake transducer. The control unit is preferably designed to compare the brake representation signal, received from the pressure sensor, with a service brake signal received from the central module or a further control unit. If the brake representation signal represents a greater deceleration demand than the service brake signal received from the central module, the control unit triggers the switching of at least one valve of the trailer control valve unit in order to permit the outputting of a brake pressure at the trailer brake pressure port on the basis of the redundancy pressure. In other words, if the driver demands a more intense deceleration than the central module or the further control unit, the central module or the further control unit is locked out, and the driver takes over manually.

The redundancy pressure signal preferably forms the brake representation signal. In this way, a particularly simple construction is realized, and the control unit receives the redundancy pressure signal as a brake representation signal, and is capable of thereupon switching one or more valves such that a corresponding brake pressure is output at the trailer brake pressure port.

According to embodiments of the invention, tractor vehicles are provided which have one of the above-described electropneumatic control modules. With regard to the refinements of the exemplary embodiments and the advantages thereof, reference is made to the above description in its entirety.

Embodiments of the invention will now be described below on the basis of the drawings. The drawings are not necessarily intended to illustrate the embodiments to scale; rather, the drawings are of schematic and/or slightly distorted form where expedient for explanatory purposes. With regard to additions to the teaching that emerges directly from the drawing, reference is made to the relevant prior art. Note here that numerous modifications and changes regarding the form and the detail of an embodiment may be made without departing from the general concept of the invention. The features of the invention disclosed in the description, in the drawings and in the claims may be essential to the refinement of the invention both individually and in any desired combination. Furthermore, the scope of the invention encompasses all combinations of at least two of the features disclosed in the description, in the drawings and/or in the claims. The general concept of the invention is not restricted to the exact form or the detail of the preferred embodiments shown and described below, or restricted to subject matter which would be restricted in relation to the subject matter claimed in the claims. Where dimensional ranges are stated, it is also the intention that values lying within the stated limits are disclosed, and can be used and claimed as desired, as limit values. For the sake of simplicity, the same reference designations are used below for identical or similar parts or parts with identical or similar function.

FIG. 1 firstly illustrates the overall construction on the basis of a vehicle combination 500, which comprises a tractor vehicle 502 and a trailer vehicle 504. The trailer vehicle 504 is shown here only schematically, specifically only one axle 506 of the trailer vehicle 504. The trailer vehicle 504 has a trailer service brake system 508 (illustrated only schematically) which is connectable by means of corresponding ports 511, 512 and pneumatic lines 513, 514 to corresponding ports 515, 516 on the tractor vehicle 502. By means of the port 515, the trailer vehicle 504 is connectable to a reservoir 525, and a brake pressure is transmitted via the port 516. The trailer service brake system 508 has schematically illustrated service brakes 510a, 510b.

The tractor vehicle 502 has a brake system 520, which comprises a first reservoir 521 for a rear-axle brake circuit 522, a second reservoir 523 for a front-axle brake circuit 524, and a third reservoir 525 for a trailer brake circuit 533 and an immobilizing brake circuit.

As a central and superordinate control unit, a central module 527 is provided, which operates purely electrically. Said central module is connected to an electropneumatic brake transducer 528, and controls the service braking during travel. For this purpose, the central module 527 is connected to a front-axle modulator 529, which controls the brake force in two front service brakes 530a, 530b, and a rear-axle modulator 531, which controls the brake force in two service brakes 532a, 532b of the rear axle. Here, the service brakes 532a, 532b are formed here as so-called Tristop brakes, and comprise both conventional hydraulic brake cylinders as service brakes and also integrated spring-type immobilizing brakes, as will be described in more detail further below.

In this exemplary embodiment, the brake system 520 also comprises an electropneumatic control module 1. For the activation of an immobilizing brake in the service brakes 532a, 532b, the brake system 520 furthermore has an electrical handbrake switch 534. In exemplary embodiments which will be discussed in yet more detail, the electrical handbrake switch 534 is electrically coupled to the electropneumatic control module 1 (as shown in FIG. 1).

The further elements shown in FIG. 1 are, in this exemplary embodiment, of a purely illustrative nature and include for example ABS modules 535a, 535b, a control unit 536 for autonomous driving, an energy source 537 for electrical energy, an SAE unit 538, steering angle sensors 539, and sensors 540a, 540b, 540c, 540d for brake pad wear sensing and sensors 541a, 541b, 541c, 541d for the rotational speed of the corresponding wheels 507a, 507b, 507c, 507d.

As can be seen in FIG. 1, the electropneumatic control module 1 is connected via a signal line 550 to the electrical handbrake switch (HCU) 534, via a redundancy pressure feed line 552 to the brake transducer 528, via a first, direct CAN bus 554 to the central module 527, via a second, indirect CAN bus 556 to the SAE unit 538, that is to say the vehicle bus (and via this, in turn, to the central module 527), via a voltage supply 557 to the energy source 537, via a voltage supply 558 to the handbrake switch 534, and via pneumatic lines 560a, 560b to the spring-type actuators of the (Tristop) service brakes 532a, 532b. For the control of the trailer vehicle 504, the electropneumatic control module 1 is connected via a trailer supply pressure port 21 to the port 515, which is also referred to as "red coupling head", and via a trailer brake pressure port 22 to the port 516, which is also referred to as "yellow coupling head". The ports and the function thereof in relation to the electropneumatic control module 1 will be discussed in more detail below.

The electropneumatic control module 1 (see FIG. 2) has a housing 2 in which the electronic control unit ECU, the trailer control unit TCV and the immobilizing brake unit EPH are integrated. As already shown in FIG. 1, the electropneumatic control module 1 is equipped with various ports (wherein the ports are not separately designated in FIG. 1) and has a reservoir input 11, which is connected via a pneumatic reservoir feed line 526 to the third compressed-air reservoir 525.

Furthermore, the electropneumatic control module 1 is connected to a superordinate control unit, in this case the central module 527, via the first, direct CAN bus 554. For this purpose, the electropneumatic control module 1 has a CAN bus connection 561. From the central module 527, the electropneumatic control module 1, and in particular the electronic control unit ECU, receives brake signals in particular for the service brakes 510a, 510b of the trailer vehicle 504, which brake signals are correspondingly pneumatically output by the electropneumatic control module 1 by means of the trailer control unit TCV at the trailer supply pressure port 21 and the trailer brake pressure port 22. From the central module 527, the electropneumatic control module 1 may furthermore receive auxiliary brake signals $S_1$, $S_2$, and/or immobilizing brake signals $S_3$, $S_4$ for the actuation of the spring-type actuators 6 (see FIG. 3) that are formed in the Tristop service brakes 532a, 532b of the tractor vehicle 502. It is also conceivable that a parking brake signal is provided by the central module 527 via the CAN bus 554, and the electronic control unit ECU correspondingly outputs a corresponding parking brake pressure $P_P$ at the spring-type actuator port 4 by means of the immobilizing brake unit EPH.

The electropneumatic control module 1 furthermore has a port 591 for the electrical handbrake switch 534. The electrical handbrake switch 534 is connected via a signal line 550 to the electrical connection 591. The electrical handbrake switch 534 provides an electrical handbrake signal $S_5$ at the connection 591. On the basis of the electrical handbrake signal $S_5$, the electronic control unit ECU is configured to control the immobilizing brake unit EPH such that a parking brake pressure $P_B$ is output at the spring-type actuator port 4.

The electropneumatic control module 1 also has a second bus connection 562. The second bus connection 562 is connected to the vehicle bus 538 via the second, indirect CAN bus line 556. Via the second bus connection 562, the control unit ECU can thus also receive signals from the control unit 536 for autonomous driving.

Figure 2:
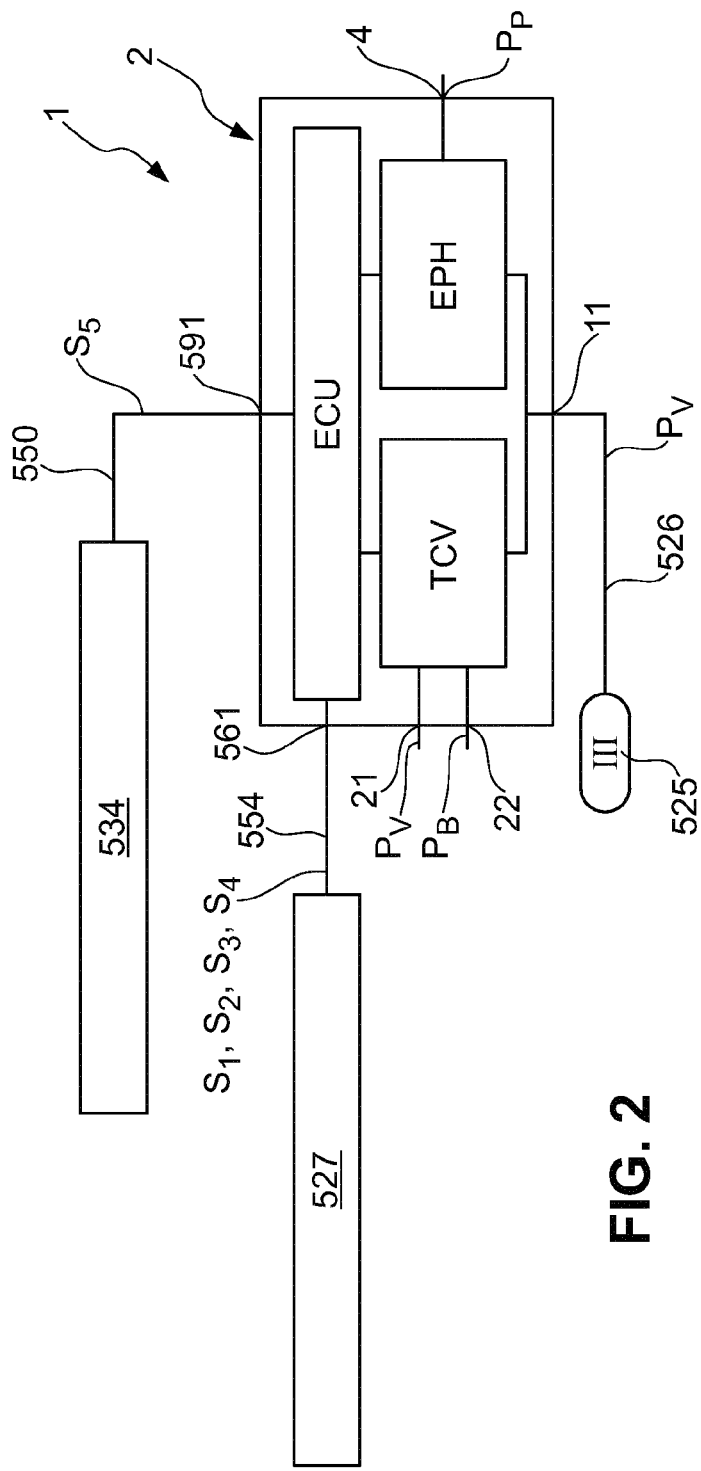
FIG. 2 is a schematic illustration of the electropneumatic control module with integrated immobilizing brake unit, trailer control unit and electronic control unit as a block circuit diagram.
Figure 3:
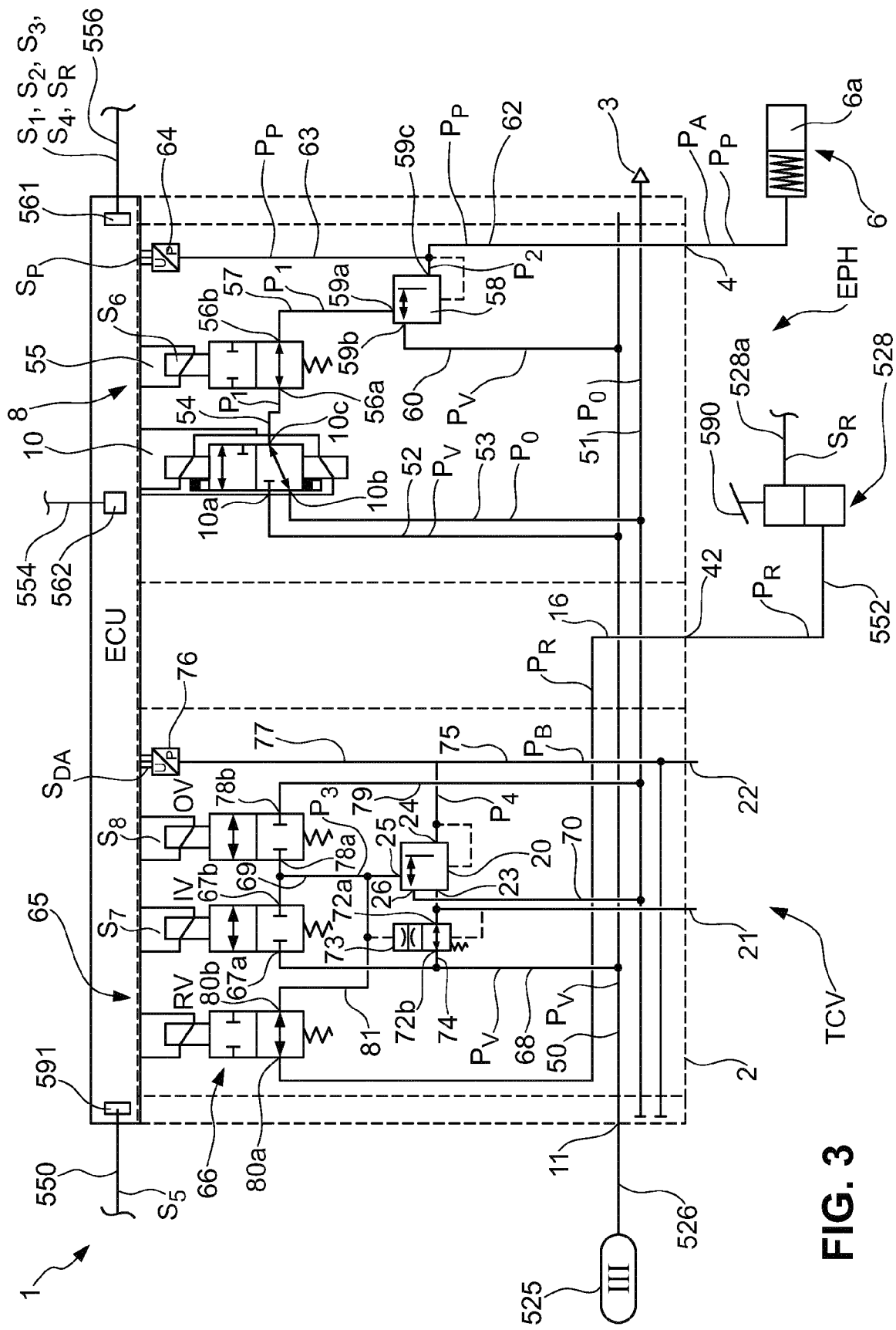
FIG. 3 shows a first exemplary embodiment of an electropneumatic control module according to the invention.

Now that the basic layout of the integrated electropneumatic control module 1 has been described, FIG. 3 shows a first specific exemplary embodiment of the electropneumatic control module 1. Identical and similar elements are denoted by the same reference designations, such that reference is made to the above description relating to FIGS. 1 and 2 in its entirety.

As already discussed with reference to FIG. 2, the electropneumatic control model 1 has a trailer control unit TCV and an immobilizing brake unit EPH. Both are integrated into a common housing 2. Also integrated into the housing 2 is an electronic control unit ECU, which controls both the trailer control unit TCV and the immobilizing brake unit EPH. The electronic control unit ECU is provided for being connected to a superordinate controller, in particular the central module 527, as shown in FIGS. 1 and 2.

The housing 2 has a reservoir input 11, which is connectable via a pneumatic reservoir feed line 526 to the third compressed-air reservoir 525. A reservoir distribution line 50 runs in the interior of the housing 2 from the reservoir input 11, via which reservoir distribution line various elements are supplied with reservoir pressure $P_V$. A ventilation distribution line 51 likewise runs in the interior of the housing 2, which ventilation distribution line leads to a pressure sink 3 and via which ventilation distribution line various elements of the electropneumatic control module 1 can be ventilated.

The immobilizing brake unit EPH has an immobilizing brake valve unit 8. The immobilizing brake valve unit 8 has a bistable valve 10. The bistable valve 10 is formed as a 3/2 directional valve, and has a first bistable valve port 10a, a second bistable valve port 10b and a third bistable valve port 10c. The first bistable valve port 10a is connected via a first reservoir branch line 52 to the reservoir distribution line 50. The second bistable valve port 10b is connected via a first ventilation branch line 53 to the pressure sink 3, such that ambient pressure $P_0$ prevails in the ventilation branch line 53. A first control line 54 is connected to the third bistable valve port 10c. The bistable valve 10 has a first and a second switching position, wherein FIG. 3 illustrates the first switching position. In the first switching position, the second bistable valve port 10b is connected to the third bistable valve port 10c, such that the first control line 54 is connected to the pressure sink 3 and can be ventilated. In the second switching position which is not shown in FIG. 3, the first bistable valve port 10a is connected to the first control line 54, such that the reservoir pressure $P_V$ can be output in the control line 54. The first control line 54 is furthermore connected to a first auxiliary brake valve port 56a of an auxiliary brake valve 55 of the immobilizing brake valve unit 8. The auxiliary brake valve 55 is electronically switchable and connected to the ECU. In this exemplary embodiment, said auxiliary brake valve is formed as a 2/2 directional valve and, aside from the first port 56a, has a second auxiliary brake valve port 56b. The auxiliary brake valve 55 is designed to be open when electrically deenergized. In the first switching position shown in FIG. 3, the auxiliary brake valve 55 is open, and in the second position which is not shown in FIG. 3, the auxiliary brake valve 55 is closed, such that the first auxiliary brake valve port 56a and the second auxiliary brake valve port 56b are separated.

Furthermore, the immobilizing brake valve unit 8 has an EPH relay valve 58. The second EPH relay valve 58 has an EPH relay valve control input 59a, an EPH relay valve reservoir port 59b, and an EPH relay valve output 59c. The EPH relay valve control input 59a of the EPH relay valve 58 is connected via a second control line 57 to the second auxiliary brake valve port 56b. The EPH relay valve reservoir port 59b of the EPH relay valve 58 is connected via a second reservoir branch line 60 to the reservoir distribution line 50, such that the reservoir pressure $P_V$ prevails at the EPH relay valve reservoir port 59b of the EPH relay valve 58. The EPH relay valve output 59c of the EPH relay valve 58 is connected via a spring-type actuator line 62 to the spring-type actuator port 4.

By means of corresponding switching of the bistable valve 10 and of the auxiliary brake valve 55, a first control pressure $P_1$ is firstly output in the first and second control line 54, 57, which first control pressure corresponds, in the case of fully opened valves 10, 55, to the reservoir pressure $P_V$. Then, by means of the EPH relay valve 58, on the basis of the first control pressure $P_1$, a second control pressure $P_2$ is output at the EPH relay valve output 59c, which second control pressure is provided at the spring-type actuator port 4 and thus forms a parking brake pressure $P_P$. During normal driving operation, the cylinder 6a of the spring-type actuator 6 is aerated, such that the spring-type actuator brakes are released. It should be understood that more than one spring-type actuator 6 may be connected to the spring-type actuator port 4. In particular, two spring-type actuators 6 may be connected, as has also been discussed in FIG. 1 with regard to the Tristop brakes 532a, 532b. It is self-evidently also possible for four or more spring-type actuators 6 to be connected. The exact number and configuration is dependent on the type of tractor vehicle 502 in which the control module 1 is used.

The auxiliary brake valve 55 is used for auxiliary braking purposes and, when the bistable valve 10 is switched into the ventilation position shown in FIG. 3, specifically into the first switching position, permits a stepped aeration and ventilation by virtue of the auxiliary brake valve 55 firstly being closed and then being opened in pulsed fashion on the basis of a signal $S_6$, such that the spring-type actuator 6 can be partially aerated and ventilated.

For closed-loop control purposes, the immobilizing brake unit EPH furthermore has a pressure sensor 64, which is connected via a first pressure measurement line 63 to the immobilizing brake line 62 and which thus detects the pressure $P_2$ or $P_P$. The pressure sensor 64 then provides a corresponding electronic signal $S_P$ to the ECU, such that closed-loop brake force control with regard to auxiliary braking can be performed by the ECU, and the ECU can control the bistable valve 10 and the auxiliary brake valve 55 correspondingly.

The trailer control unit TCV has a trailer control valve unit 65. The trailer control valve unit 65 has an inlet-outlet valve unit 66, also referred to as pilot-control unit, which has an inlet valve IV, an outlet valve OV and a switching valve, formed here as a redundancy valve RV. Furthermore, the trailer control valve unit 65 has a first relay valve 20 which is specifically formed not as an inverse relay valve but as a "normal relay valve". The inlet valve IV is formed as a 2/2 directional valve and has a first inlet valve port 67a and a second inlet valve port 67b. The first inlet valve port 67a is connected to a third reservoir pressure branch line 68, and the second inlet valve port 67b is connected to a third control line 69. While the reservoir pressure $P_V$ prevails in the third reservoir pressure branch line 68, a third control pressure $P_3$ (service brake control pressure) can be output in the third control line 69 by electrical switching of the inlet valve IV on the basis of a signal $S_7$ from the control unit ECU. The third control line 69 is connected to a control input 25 of the first relay valve 20.

The first relay valve 20 furthermore has a relay valve working input 23, a relay valve working output 24 and a relay valve ventilation output 26. The relay valve ventilation output 26 is connected via a second ventilation branch line 70 to the ventilation distribution line 51 and thus to the pressure sink 3. The relay valve working input 23 serves for receiving a reservoir pressure $P_V$, and is initially connected to a fourth reservoir pressure branch line 71, which is connected to a first port 72a of a trailer breakaway valve 73. The trailer breakaway valve 73 is formed as a pneumatically switched 2/2 directional valve and is open when unpressurized, in the switching position shown in FIG. 3. With corresponding switching of the trailer breakaway valve 73, the first port 72a of the trailer breakaway valve 73 is connected via a throttle to the second port 72b of the trailer breakaway valve 73, which in turn is connected via a fifth reservoir pressure branch line 74 to the third reservoir pressure branch line 68. During normal operation, the trailer breakaway valve 73 is however in the position shown in FIG. 3, such that the reservoir pressure $P_V$ prevails at the relay valve working input 23. Furthermore, by means of the trailer breakaway valve 73, the trailer supply pressure port 21 is supplied with reservoir pressure $P_V$ via a trailer supply line 86.

If the first relay valve 20 now receives the service brake control pressure $P_3$ at the relay valve control input 25, the first relay valve 20 outputs a corresponding fourth control pressure $P_4$ at the relay valve output 24 and provides said brake pressure as brake pressure $P_B$ at the trailer brake pressure port 22 via a trailer brake pressure line 75. For corresponding closed-loop pressure control, a brake pressure sensor 76 for the trailer control unit TCV is provided, which brake pressure sensor is connected via a brake pressure measurement line 77 to the trailer brake pressure line 75 and provides a corresponding pressure signal $S_{DA}$ at the control unit ECU.

The outlet valve OV is electropneumatically switched and, upon receipt of a signal $S_B$ from the control unit ECU, can be moved from the first, electrically deenergized switching state shown in FIG. 3, in which said outlet valve is closed, into an open switching state, which is not shown in FIG. 3.

The outlet valve OV is provided for ventilating the brakes and thus for reducing a brake pressure $P_B$. Like the inlet valve IV, the outlet valve OV is designed as a 2/2 directional valve and has a first outlet valve port 78a and a second outlet valve port 78b. The first outlet valve port 78a is connected to the third control line 69, and the second outlet valve port 78b is connected to a third ventilation branch line 79. The third ventilation branch line 79 runs from the second outlet valve port 78b to the ventilation distribution line 51 and thus to the pressure sink 3.

In one variant, the inlet and outlet valves IV/OV are integrated and formed as a 3/2 directional valve, wherein a first port is connected to the line 68, a second port is connected to the line 69, and a third port is connected to the line 79.

In order, in a fault situation in which no signals $S_7$, $S_8$ are provided by the control unit ECU and the inlet and outlet valves IV, OV are electrically deenergized, to be able to manually replace the brake pressure $P_B$ that is output by the control unit ECU in the normal situation, the electropneumatic control module 1 has a redundancy pressure port 42. A brake transducer 528 is connected to the redundancy pressure port 42 via a redundancy pressure feed line 552. In the interior of the housing 2, a first redundancy pressure line 16 is connected to the redundancy pressure port 42. The redundancy pressure line 16 runs to a first redundancy valve port 80a. The second redundancy valve port 80b is connected to a redundancy pressure control line 81, which opens into the third control line 69 and thus into the control input 25 of the first relay valve 20. The redundancy valve RV is formed as a 2/2 directional valve and has a first and a second switching position, wherein said redundancy valve is shown in the first, open switching position in FIG. 3.

The redundancy valve RV is open when electrically deenergized and serves to be able to output a brake pressure $P_B$ even in the fault situation in which the inlet-outlet valve unit 66 is electrically deenergized. If, in the fault situation, a redundancy pressure $P_R$ is output in the redundancy pressure feed line 552 by actuation of the pedal 590 of the brake transducer 528, said redundancy pressure $P_R$ is provided at the control input 25 of the first relay valve 20 via the first redundancy pressure line 16, the open redundancy valve RV and the redundancy pressure control line 81. The brake pressure $P_B$ is consequently output at the output 24 of the second relay valve 20.

Figure 4:
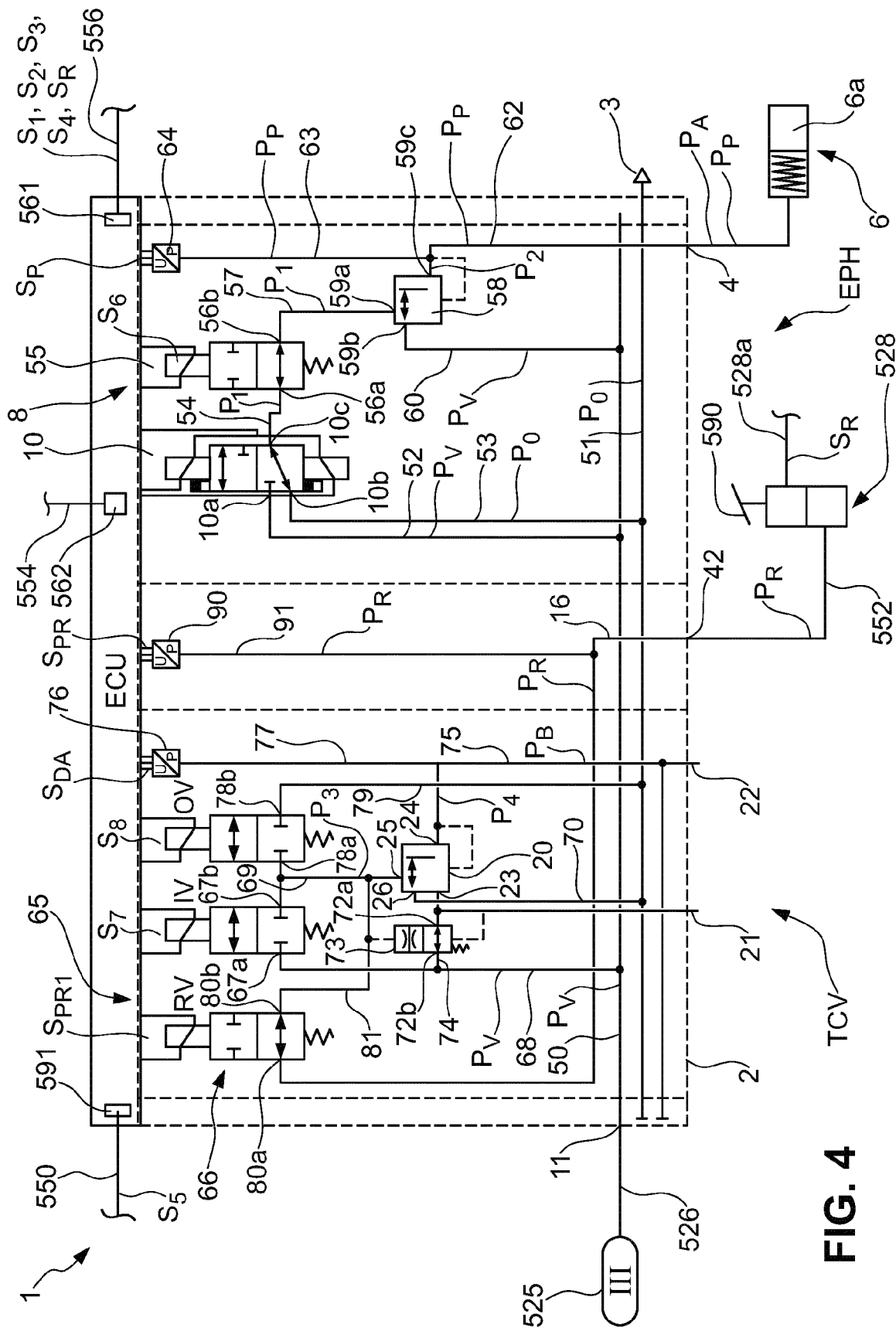
FIG. 4 shows a second exemplary embodiment of an electropneumatic control module according to the invention.

FIG. 4 illustrates a second preferred exemplary embodiment of the invention. Identical and similar elements are denoted by the same reference designations, and in this respect reference is made to the above description relating to FIGS. 1 and 3 in its entirety. Substantially the differences will be discussed below.

The only difference between the first and second exemplary embodiments lies in a redundant pressure sensor 90. The redundant pressure sensor 90 is connected via a redundancy pressure measurement line 91 to the first redundancy pressure line 16. Consequently, the redundant pressure sensor 90 measures the pressure $P_R$ in the first redundancy pressure line 16, which is output manually at the redundancy pressure port 42 by actuation of the brake pedal 590. With reference to the first exemplary embodiment (FIG. 3), it has already been described how the manually output redundancy pressure $P_R$ leads, via the first redundancy pressure line 16 and the relay valve 20, to a brake pressure $P_B$ output at the trailer brake pressure port 22. It has likewise been described that the handbrake switch 534 provides a redundant electrical brake signal $S_R$ or a brake representation signal at the port 591 of the control unit ECU.

The redundant pressure sensor 90 can be utilized for identifying a driver interaction in the case of autonomous control of the brake system 520. The redundant pressure sensor 90 measures the manually output redundancy pressure $P_R$ and provides a corresponding signal $S_{PR}$ at the control unit ECU.

The redundancy pressure signal $S_{PR}$ provided by the redundant pressure sensor 90 represents a driver demand, because the pressure sensor 90 detects the redundancy pressure $P_R$ output manually by means of the brake transducer 528. The control unit ECU is preferably configured to compare the signal $S_{PR}$, which it receives from the pressure sensor 90, with a service brake signal, which it receives for example from the control unit 536 for autonomous driving via the second CAN bus 554. If the redundant electronic brake signal $S_R$ or the pressure signal $S_{PR}$ represents a greater deceleration demand than the service brake signal received from the control unit 536, the control unit ECU triggers the switching of the redundancy valve RV in order to permit the manual outputting of a brake pressure $P_B$ at the trailer brake pressure port 22 on the basis of the redundancy pressure $P_R$. In other words, if the driver demands a more intense deceleration than the central module 527 or the control unit 536 for autonomous driving, the central module is locked out, and the driver takes over manually.

By contrast to the prior art, the first relay valve 20 is not designed as an inverse relay valve. "Automatic" outputting of a brake pressure $P_B$ at the trailer brake pressure port 22 in the situation in which the spring-type actuators 6 are ventilated, as is the case in "European trailer control", does not occur in the case of the present "Scandinavian trailer control". In the situation in which the spring-type actuators 6 are used for auxiliary braking or additional braking, a service brake control pressure $P_3$ is output at the relay valve control input 25 of the relay valve 20 on the basis of a corresponding signal $S_7$, such that the service brakes 510a, 510b of the trailer vehicle 504 are braked in correspondence with the spring-type actuators 6.

Figure 5:
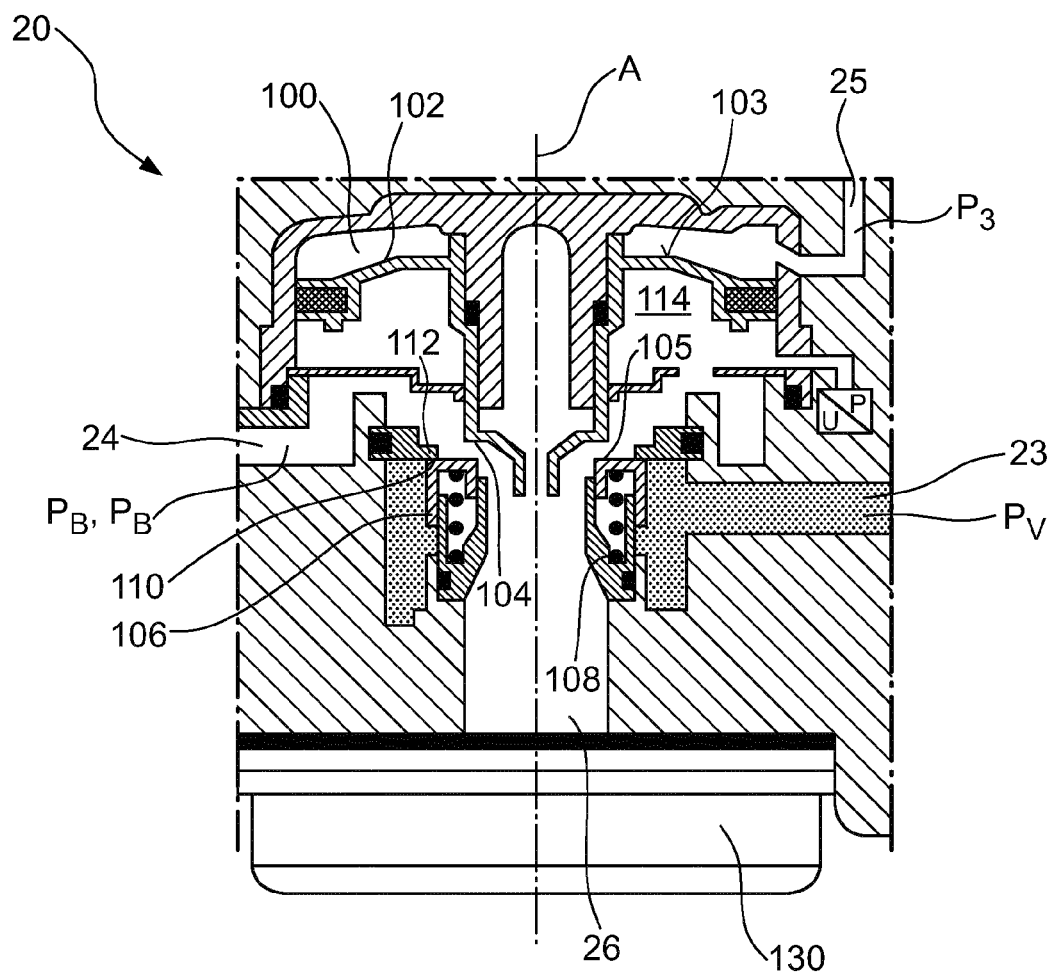
FIG. 5 is a detail illustration of the first relay valve.

Furthermore, by contrast to the situation known in the prior art, the first relay valve 20 is formed with only one common control chamber 100 (see FIG. 5). As has already been discussed with reference to FIGS. 3 and 4, the relay valve 20 has a relay valve control input 25, the relay valve working input 23 to which the fourth branch line 71 of the reservoir distribution line 50 is connected and at which the pressure $P_V$ prevails, a relay valve output 24, which is connected via the trailer brake pressure line 75 to the trailer brake pressure port 22 and via which the control pressure $P_4$ or the brake pressure $P_B$ can be output, and a relay valve ventilation output 26, via which the relay valve output 24 can be ventilated and which is connected to the pressure sink 3. A pressure $P_0$ consequently prevails at the relay valve ventilation output 26, which pressure corresponds to the pressure of the pressure sink 3, in particular of the surroundings. In this exemplary embodiment, the ventilation output 26 runs via a noise damper 130, which is not shown in detail but which is known in the prior art.

The single control chamber 100 is connected to the single relay valve control input 25. The single control chamber 100 is delimited by a single control piston 102, which has a single control surface 103. The single control piston 102 is guided so as to slide axially along an axis A. When the relay valve control input 25 is aerated with the service brake control pressure $P_3$ or the redundancy pressure $P_R$, the piston 102 can move downward in relation to FIG. 5 and, by means of a valve seat 104, makes contact with a corresponding valve seat 105 of a slide ring 106. The slide ring 106 is spring-loaded by means of a spiral spring 108 and is preloaded into the upper position shown in FIG. 5. The slide ring 106 has a second valve seat 110, which seals off against a projection 112 and thus holds the relay valve working input 23 closed in the unpressurized state, that is to say in the absence of control pressure $P_3$.

Figure 7:
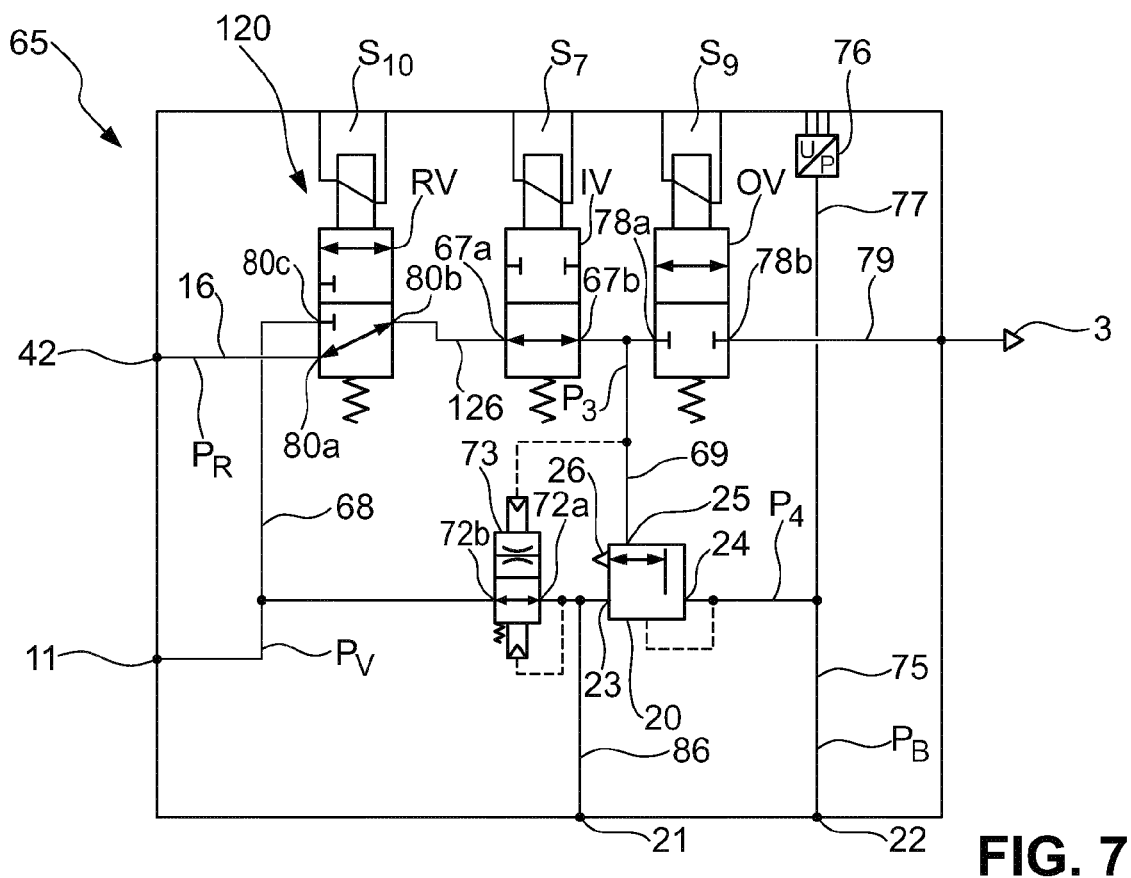
FIG. 7 shows a fourth exemplary embodiment of an electropneumatic control module according to the invention.

The control piston is shown in an open position in FIG. 7. In its shut-off position, the valve seat 104 is in contact with the slide ring 106. In the shut-off position, both the input 23 and the output 24 are closed off with respect to the ventilation output 26.

Owing to the output service brake control pressure $P_3$, a force acts on the control piston 102, which force leads to the opening of the valve seat 110, such that the pressure $P_V$ can pass over into the working space 114. The pressure in the working space 114 increases and leads to an opposing force on the control piston 102, such that the control piston moves back into the shut-off position. A brake pressure $P_B$ is correspondingly output at the output 24, and is held there.

Since, owing to the switching of redundancy valve RV and inlet valve IV and of the redundancy pressure control line 81 and of the third control line 69, both an electronically output service brake control pressure $P_3$ and the manually output redundancy pressure $P_R$ can prevail at the relay valve control input 25, it is possible by means of the first relay valve 20, which has only a single control piston 102 and a common control chamber 100 for the two pressures $P_3$, $P_R$, to output both the electrically output brake pressure $P_B$, and also, manually, a brake pressure $P_B$ as a redundancy pressure, at the trailer brake pressure port 22.

Figure 6:
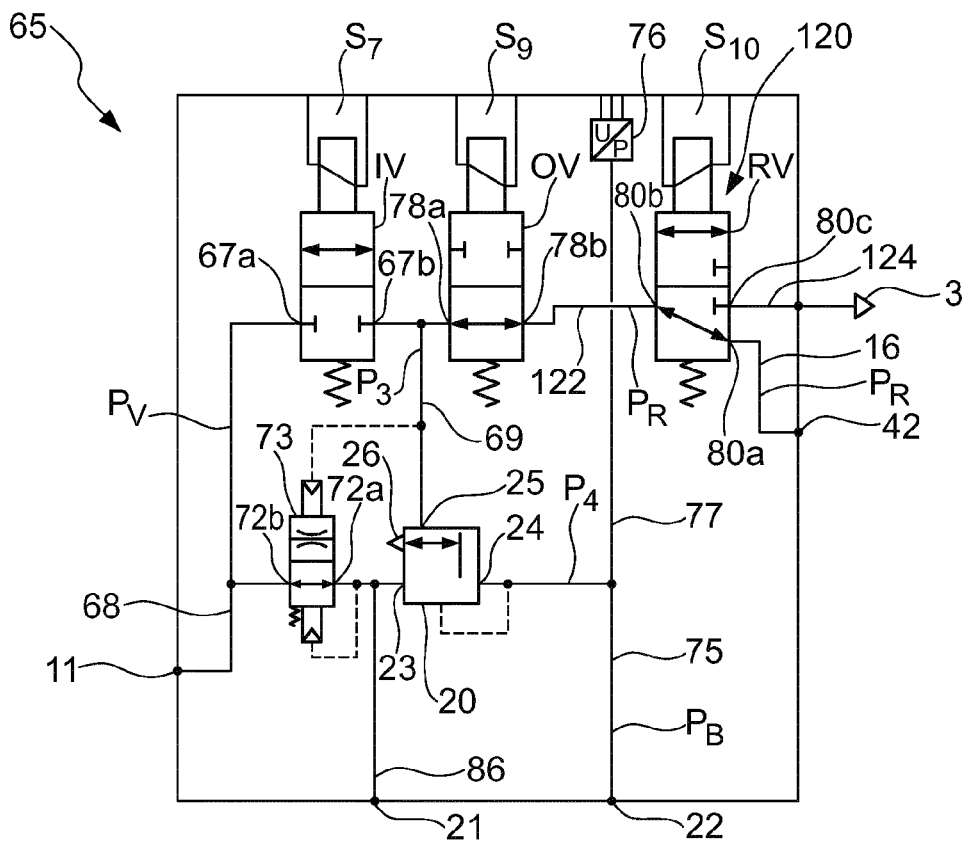
FIG. 6 shows a third exemplary embodiment of an electropneumatic control module according to the invention.

FIGS. 6 and 7 show a third and a fourth exemplary embodiment of the electropneumatic control module 1, or of the trailer control valve unit 65. Since the rest of the elements in the third and fourth exemplary embodiments (FIGS. 6 and 7) are identical to the first and second exemplary embodiments (FIGS. 3 and 4), in each case only the trailer control valve unit 65 is shown in FIGS. 6 and 7. Identical or similar elements are denoted by the same reference designations, such that reference is made to the above description in its entirety.

Both in the third exemplary embodiment (FIG. 6) and in the fourth exemplary embodiment (FIG. 7), a major difference is that the redundancy valve RV is designed as a 3/2 directional valve 120.

With regard to the third exemplary embodiment (FIG. 6), the major difference lies in the interconnection of the redundancy valve RV, which is designed as a 3/2 directional valve 120. A further difference lies in the reversal of the outlet valve OV, which is reversed in terms of the switching positions such that it is open when electrically deenergized, as in the switching position shown in FIG. 6. By contrast to the first and second exemplary embodiments (FIGS. 3 and 4), the outlet valve is, by way of its second outlet valve port 78b, connected not directly to the third ventilation branch line 79 but rather to a first connecting line 122, which connects the second outlet valve port 78b to the second redundancy valve port 80b. The third redundancy valve port 80c of the 3/2 directional valve 120 is connected via a fourth ventilation branch line 124 to the pressure sink 3.

The mode of operation of this layout is as follows: During normal driving operation, the outlet valve OV is switched, on the basis of a signal $S_9$ provided by the control unit ECU, into the second, closed switching position (not shown). By means of switching of the inlet valve IV on the basis of the signal $S_7$ of the electronic control unit ECU, it is then possible for a control pressure $P_3$ to be output at the relay valve control input 25 of the first relay valve 20, and, on the basis of this in turn, for a control pressure $P_4$ to be output at the relay valve output 24. During normal driving operation, the redundancy valve RV is also in the second switching position (not shown), on the basis of a signal $S_{10}$. In the electrically deenergized state (as shown in FIG. 6), the first redundancy valve port 80a is connected to the second redundancy valve port 80b, such that the redundancy pressure $P_R$ can be output in the first connecting line 122. During normal driving operation, it is however preferable for the redundancy pressure $P_R$ to be locked out, and the signal $S_{10}$ is thus applied in order to move the redundancy valve RV into the second switching position (not shown). In this second switching position (not shown), the second redundancy valve port 80b is connected to the third redundancy valve port 80c. That is to say, in the second switching position (not shown), of the redundancy valve RV, the pressure sink 3 is connected to the second outlet valve port 78b. Consequently, by means of corresponding switching of the outlet valve OV, the relay valve control input 25 can be ventilated into the electrically deenergized position, so as not output a brake pressure $P_B$ at the trailer brake pressure port 22.

The advantage of this switching is evident in the event of a fault, if a signal can no longer be output by the electronic control unit ECU. In this case, the inlet valve IV, the outlet valve OV and the redundancy valve RV are each situated in the electrically deenergized state shown in FIG. 6. In this state, the reservoir pressure $P_V$ is locked out by means of the inlet valve IV, and the redundancy pressure $P_R$ prevails at the relay valve control input 25 of the first relay valve 20. Even in the event of a failure of the electronic control unit ECU, it is thus possible for an operator to redundantly output a brake pressure $P_B$ at the trailer brake pressure port 22 by means of the brake transducer 528.

A fourth exemplary embodiment is shown in FIG. 7. Again, the differences lie only in the trailer control valve unit 65, and therefore only this is illustrated in FIG. 7. It should however be understood that this likewise interacts with the further components of the electropneumatic control module 1 as illustrated in FIGS. 3 and 4.

It is also the case in the embodiment of the electropneumatic control module 1 shown in FIG. 7, or more specifically the detail of the trailer control valve 65, that the redundancy valve RV is designed as a 3/2 directional valve 120. The first redundancy valve port 80a is in turn connected via the first redundancy pressure line 16 to the redundancy pressure port 42. The second redundancy valve port 80b is, as is also the case in the first and second exemplary embodiment (FIGS. 3 and 4), connected to a pneumatic line, in this case a second connecting line 126. By contrast to the first and second exemplary embodiments, the third redundancy valve port 80c is connected to the third reservoir pressure branch line 68. The second connecting line 126 is furthermore connected to the first port 67a of the inlet valve IV, and the second inlet valve port 67b is, as is also the case in the first exemplary embodiment, connected to the control line 69.

The mode of operation of this circuit layout is as follows: In the electrically deenergized state, that is to say in the absence of signal $S_{10}$, the redundancy valve RV is situated in the first switching position shown in FIG. 7. In this first, electrically deenergized switching position, the first redundancy valve port 80a is connected to the second redundancy valve port 80b. Thus, in the electrically deenergized position, a redundancy pressure $P_R$ can be output at the second connecting line 126. During normal driving operation, however, a signal $S_{10}$ is switched, such that the third redundancy valve port 80c is connected to the second redundancy valve port 80b, and the reservoir pressure $P_V$ is output at the second connecting line 126.

The inlet valve IV is in an electrically deenergized open state and in the first switching position (shown in FIG. 7), and the outlet valve OV is in the electrically deenergized closed state and in the first switching position (shown in FIG. 7). During normal driving operation, the inlet valve IV is closed, and a signal $S_7$ is applied. If the inlet valve IV is now opened, the control pressure $P_3$ from the reservoir input 11 can be output at the relay valve control input 25 via the third reservoir branch line 68, the third redundancy valve port 80c, the third redundancy valve port 80b, the second connecting line 126, the first inlet valve port 67a, the second inlet valve port 67b and the third control line 69, whereby, in turn, a brake pressure $P_B$ is output at the trailer brake pressure port 22. For the ventilation of the relay valve control input 25, a signal $S_9$ is then transmitted by the electronic control unit ECU to the outlet valve OV, such that the latter is switched into the second switching position (open switching position), whereas the inlet valve IV is, by means of a signal $S_7$, moved into the closed, second switching position. Consequently, the relay valve control input 25 is connected via the third control line 69, the first outlet valve port 78a, the second outlet valve port 78b and the third ventilation branch line 79 to the pressure sink 3, and can be ventilated. The brake pressure $P_B$ decreases again.

In this layout, too, the position of the valves RV, IV, OV is selected such that, in the event that the control unit ECU fails, a redundancy pressure $P_R$ at the redundancy pressure port 42 has the effect that a brake pressure $P_B$ is output at the trailer brake pressure port 22. In the electrically deenergized state, the redundancy valve RV connects the redundancy pressure port 42 to the second connecting line 126. The inlet valve IV is in the electrically deenergized open state, and the redundancy pressure $P_R$ can pass via the inlet valve IV into the third control line 69. The outlet valve OV is in the electrically deenergized closed state, and shuts off the third control line 69 with respect to the pressure sink 3. Thus, in this case, the redundancy pressure PR prevails at the relay valve control input 25, and a brake pressure $P_B$ can be output at the trailer brake pressure port 22.

Figure 8:
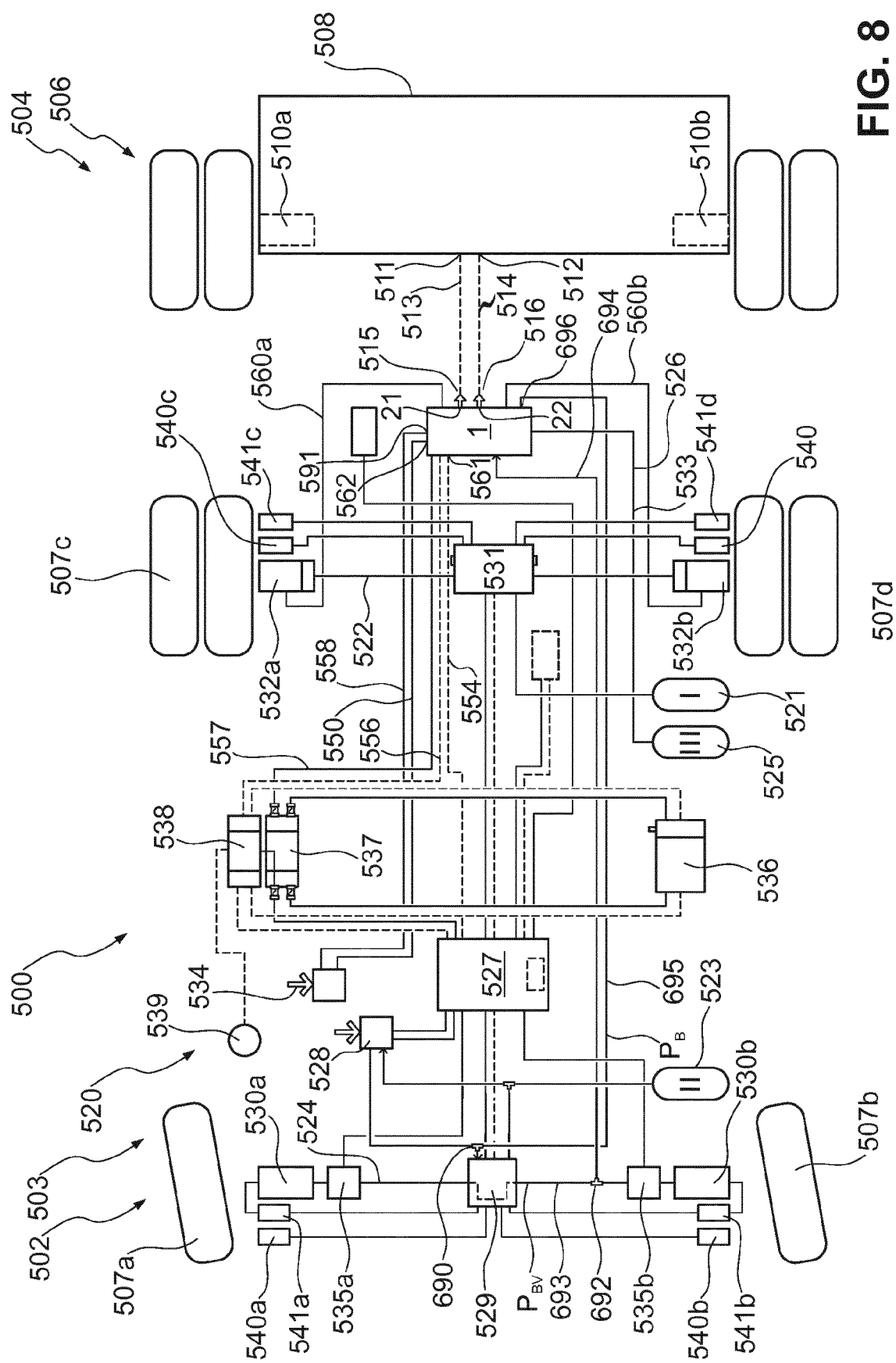
FIG. 8 shows a schematic overall layout of a brake system for a vehicle combination with an electropneumatic control module according to the invention according to a fifth exemplary embodiment.

FIG. 8 now shows a fifth exemplary embodiment. The brake system 520 shown in FIG. 8 is basically similar to that according to FIG. 1, and identical and similar elements are denoted by the same reference designations. In this respect, reference is made to the above description of FIG. 1 in its entirety. Therefore, substantially the differences will be discussed below.

By contrast to the first exemplary embodiment of FIG. 1, the redundancy port 42 is not connected via the redundancy pressure feed line 552 to the brake transducer 528; rather, the brake pressure of another vehicle axle, in this exemplary embodiment the front axle brake pressure $P_{BV}$, is output at the redundancy port 42. For this purpose, a second redundancy pressure feed line 694 is provided, which is connected via a T-piece 692 to a front-axle brake pressure line 693. Via this second redundancy pressure feed line 694, the front-axle brake pressure $P_{BV}$ of the service brakes 530a, 530b of the front axle 503 is output at the redundancy pressure port 42.

The brake transducer 528 is then, by contrast to the first exemplary embodiment (FIG. 1), connected via a front-axle shuttle valve 690 to the front-axle modulator 529 in order to redundantly output the brake transducer control pressure $P_{BST}$ at the front-axle modulator 529. If both the electropneumatic control module 1 is electrically deenergized owing to a fault and the front-axle modulator 529 is electrically deenergized owing to the fault or another fault, it is possible in this way for the brake transducer control pressure $P_{BST}$ that is output manually by means of the foot-operated pedal 600 to be output via the front-axle modulator 529 as redundancy pressure $P_R$ at the redundancy pressure port 42 of the electropneumatic control module 1.

Conversely, a control line 695 of the electropneumatic control module 1 is connected to the front-axle shuttle valve 690, into which control line the brake pressure $P_B$ of the trailer 504 is output by the electropneumatic control module 1. The control line 695 is shown in FIG. 8 as being connected separately to a front-axle control line port 696 of the electropneumatic control module 1; in other embodiments, it may also branch off from the pneumatic line 514 to the trailer vehicle 504.

The front-axle shuttle valve 690 is formed for example as a select-high valve, such that always the higher pressure of the brake pressure $P_B$ and the brake transducer control pressure $P_{BST}$ is output at the front-axle modulator 529.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

A Axis
ECU Electronic control unit
EPH Immobilizing brake unit
IV Inlet valve
OV Outlet valve
$P_0$ Ambient pressure
$P_1$ First control pressure
$P_2$ Second control pressure
$P_3$ Third control pressure (service brake control pressure)
$P_4$ Fourth control pressure
$P_B$ Brake pressure at the trailer brake pressure port 22
$P_{BST}$ Brake transducer brake pressure
$P_{BV}$ Front-axle brake pressure
$P_P$ Parking brake pressure at the spring-type actuator port 4
$P_R$ Redundancy pressure
$P_V$ Reservoir pressure
RV Redundancy valve (switching valve)
$S_1$ Brake signal (first auxiliary brake signal)
$S_2$ Brake signal (second auxiliary brake signal)
$S_3$ Immobilizing brake signal
$S_4$ Immobilizing brake signal
$S_5$ Handbrake signal
$S_6$ Signal for auxiliary brake valve
$S_7$ Signal for inlet valve
$S_8$ Signal for outlet valve
$S_9$ Signal for outlet valve
$S_{10}$ Signal for redundancy valve
$S_{DA}$ Pressure signal
$S_P$ Signal of the pressure sensor 64
$S_R$ Redundant electronic brake signal
TCV Trailer control unit
1 Electropneumatic control module
2 Housing
3 Pressure sink
4 Spring-type actuator port
6 Spring-type actuator
6a Cylinder of the spring-type actuator
8 Immobilizing brake valve unit
10 Bistable valve
10a First bistable valve port
10b Second bistable valve port
10c Third bistable valve port
11 Reservoir input
16 First redundancy pressure line
17 Second redundancy pressure line
20 First relay valve
21 Trailer supply pressure port
22 Trailer brake pressure port
23 Relay valve working input
24 Relay valve output
25 Relay valve control input
26 Relay valve ventilation output
42 Redundancy pressure port
50 Reservoir distribution line
51 Ventilation distribution line
52 First reservoir branch line
53 First ventilation branch line
54 First control line
55 Auxiliary brake valve
56a First auxiliary brake valve port
56b Second auxiliary brake valve port
57 Second control line
58 EPH relay valve
59a EPH relay valve control input
59b EPH relay valve reservoir port
59c EPH relay valve output
60 Second reservoir branch line
62 Spring-type actuator line
63 First pressure measurement line
64 Pressure sensor
65 Trailer control valve unit
66 Inlet-outlet valve unit (pilot-control unit)
67a First inlet valve port
67b Second inlet valve port
68 Third reservoir pressure branch line
69 Third control line
70 Second ventilation branch line
71 Fourth reservoir pressure branch line
72a First port of the trailer breakaway valve
72b Second port of the trailer breakaway valve
73 Trailer breakaway valve
74 Fifth reservoir pressure branch line
75 Trailer brake pressure line
76 Brake pressure sensor
77 Brake pressure measurement line
78a First outlet valve port
78b Second outlet valve port
79 Third ventilation branch line
80a First redundancy valve port
80b Second redundancy valve port
80c Third redundancy valve port
81 Redundancy pressure control line
86 Trailer supply line
90 Redundant pressure sensor
91 Redundancy pressure measurement line
100 Control chamber
102 Control piston
103 Control surface
104 Valve seat of the control piston
105 Valve seat of a slide ring
106 Slide ring
108 Spiral spring
110 Second valve seat
112 Projection
114 Working space
120 3/2 directional valve
122 First connecting line
124 Fourth ventilation branch line
126 Second connecting line
130 Noise damper
500 Vehicle combination
502 Tractor vehicle
503 Front axle
504 Trailer vehicle
506 Axle of the trailer vehicle 504
507a, 507b, 507c, 507d Wheels
508 Trailer service brake system
510a, 510b Two service brakes 511, 512 Ports
513, 514 Pneumatic lines
515, 516 Ports
520 Pneumatic brake system
521 First reservoir
522 Rear-axle brake circuit
523 Second reservoir
524 Front-axle brake circuit
525 Third reservoir
526 Pneumatic reservoir feed line
527 Central module
528 Brake transducer (BST)
529 Front-axle modulator
530a, 530b Two front service brakes
531 Rear-axle modulator
532a, 532b Two (Tristop) service brakes
533 Trailer brake circuit
534 Electronic handbrake switch (HCU)
535a, 535b ABS modules
536 Control unit
537 Energy source
538 SAE unit (vehicle bus)
539 Steering angle sensor
540a, 540b, 540c, 540d Sensors for brake pad wear sensing
541a, 541b, 541c, 541d Sensors for a rotational speed of the wheels
550 Signal line
552 Redundancy pressure feed line
554 First CAN bus (direct)
556 Second CAN bus (indirect)
557 Voltage supply
558 Voltage supply
560a, 560b Pneumatic lines
561 First bus connection
562 Second bus connection
590 Brake pedal
591 Electrical connection for HCU
690 Front-axle shuttle valve
692 T-piece
693 Front-axle brake pressure line
694 Second redundancy pressure feed line
695 Control line
696 Front-axle control line port

The invention claimed is:

1. An electropneumatic control module for an electronically controllable pneumatic brake system for a vehicle combination with a tractor vehicle and a trailer vehicle, the electropneumatic control module comprising:
a pneumatic reservoir input, which is connectable to a compressed-air reservoir,
a trailer control unit, which has a trailer control valve unit with one or more electropneumatic valves, a trailer brake pressure port and a trailer supply pressure port,
an immobilizing brake unit, which has a spring force actuator port for a spring force actuator, a spring force actuator configured to output a spring force to effectuate a parking brake force for a tractor vehicle, and an immobilizing brake valve unit with one or more electropneumatic valves, and
an electronic control unit for controlling the trailer control valve unit and the immobilizing brake valve unit,
wherein the trailer control unit has a first relay valve, which has a relay valve working input connected to the reservoir input, a relay valve output connected to the trailer brake pressure port, and a relay valve ventilation output, via which the relay valve output is connectable to a pressure sink,
wherein the first relay valve has only a single relay valve control input, which opens into a common control chamber of the first relay valve,
wherein the relay valve control input is connectable by means of the trailer control valve unit to the reservoir input and/or to a ventilation means in order to output a service brake control pressure in the common control chamber, and wherein, in the event of a fault of the electropneumatic control module, a redundancy pressure can be output into the common control chamber in order to output a brake pressure at the trailer brake pressure port.

2. The electropneumatic control module as claimed in claim 1, wherein the common control chamber of the first relay valve is a sole control chamber of the first relay valve.

3. The electropneumatic control module as claimed in claim 1, wherein the common control chamber of the first relay valve is delimited by a single control piston.

4. The electropneumatic control module as claimed in claim 3, wherein the control piston of the first relay valve has a single control surface.

5. The electropneumatic control module as claimed in claim 1, wherein the one or more electropneumatic valves of the trailer control valve unit include an electronically switchable inlet valve with at least one first and one second inlet valve port, wherein the first inlet valve port is connected to the reservoir input, and the second inlet valve port is connected to the control chamber of the first relay valve, in order to aerate the control chamber through switching of the inlet valve.

6. The electropneumatic control module as claimed in claim 1, further comprising a redundancy pressure port with a first redundancy pressure line for the connection of a brake transducer or of a brake or control pressure of a tractor vehicle axle, via which redundancy pressure port the brake pressure can be output at the trailer brake pressure port.

7. The electropneumatic control module as claimed in claim 1, further comprising a redundancy pressure port via which the brake pressure at the trailer brake pressure port is configured to be output in a controlled manner, wherein a brake pressure of a service brake can be output at the redundancy pressure port.

8. The electropneumatic control module as claimed in claim 6, wherein the one or more electropneumatic valves of the trailer control valve unit include an electronically switchable redundancy valve with at least one first and one second redundancy valve port, wherein the first redundancy valve port is connected to the redundancy pressure port, and the second redundancy valve port is connected via a second redundancy pressure line to the control chamber of the first relay valve, in order to output the redundancy pressure in the control chamber through switching of the redundancy valve.

9. The electropneumatic control module as claimed in claim 1, wherein the one or more electropneumatic valves of the trailer control valve unit further include an electronically switchable outlet valve with at least one first and one second outlet valve port, wherein the first outlet valve port is connected to the control chamber of the first relay valve, and the second outlet valve port is connected to a pressure sink, in order to ventilate the control chamber through switching of the outlet valve.

10. The electropneumatic control module as claimed in claim 8, wherein the redundancy valve is a 3/2 directional valve and has a third redundancy valve port, wherein the third redundancy valve port is connected to a pressure sink.

11. The electropneumatic control module as claimed in claim 8, wherein the one or more electropneumatic valves of the trailer control valve unit further include an electronically switchable outlet valve with at least one first and one second outlet valve port, wherein the first outlet valve port is connected to the control chamber of the first relay valve, and the second outlet valve port is connected to a pressure sink, in order to ventilate the control chamber through switching of the outlet valve, and wherein the second redundancy pressure line is connected to the second outlet valve port, such that, in a first switching position of the redundancy valve, in an open position of the outlet valve, the redundancy pressure can be output from the redundancy pressure port, via the redundancy valve and the outlet valve into the control chamber, and in a second switching position of the redundancy valve, the control chamber can be ventilated via the opened outlet valve and the redundancy valve.

12. The electropneumatic control module as claimed in claim 8, wherein the redundancy valve is a 3/2 directional valve and has a third redundancy valve port, wherein the third redundancy valve port is connected to the reservoir input.

13. The electropneumatic control module as claimed in claim 12, wherein the one or more electropneumatic valves of the trailer control valve unit further include an electronically switchable inlet valve with at least one first and one second inlet valve port, wherein the first inlet valve port is connected to the reservoir input, and the second inlet valve port is connected to the control chamber of the first relay valve, in order to aerate the control chamber through switching of the inlet valve, and wherein the second redundancy pressure line is connected to the first inlet valve port, such that, in a first switching position of the redundancy valve, in the case of an open inlet valve, the redundancy pressure can be output from the redundancy pressure port, via the redundancy valve and the inlet valve into the control chamber, and in a second switching position of the redundancy valve, the control pressure can be output from the reservoir input, via the redundancy valve and the inlet valve into the control chamber.

14. The electropneumatic control module as claimed in claim 1, wherein the electronic control unit is configured to, based on a first electronic auxiliary brake signal, trigger the immobilizing brake valve unit to switch at least one of the one or more electropneumatic valves of the immobilizing brake valve unit such that a working pressure for the temporary and stepped ventilation of the spring force actuator can be output at the spring force actuator port; and wherein the electronic control unit (ECU) is further configured to, based on the first electronic auxiliary brake signal or a second auxiliary brake signal, trigger the trailer control valve unit to switch at least one of the one or more electropneumatic valves of the trailer control valve unit such that a brake pressure can be output at the trailer brake pressure port.

15. The electropneumatic control module as claimed in claim 1, wherein the electronic control unit, the trailer control unit and the immobilizing brake unit are integrated in one module.

16. The electropneumatic control module as claimed in claim 1, having a common housing in which at least the components of the electronic control unit, of the trailer control unit and of the immobilizing brake unit are arranged.

17. The electropneumatic control module as claimed in claim 1, wherein no inverse relay valve is provided.

18. The electropneumatic control module as claimed in claim 1, having an electrical connection for receiving a redundant electronic brake representation signal, wherein the control unit is configured to switch at least one of the one or more electropneumatic valves of the trailer control valve unit in a manner dependent on the received redundant electronic brake representation signal, such that a corresponding brake pressure is output at the trailer brake pressure port.

19. The electropneumatic control module as claimed in claim 18, wherein the brake representation signal represents the actuation of an immobilizing brake of the tractor vehicle.

20. The electropneumatic control module as claimed in claim 18, having a redundant pressure sensor, which is arranged on a redundancy pressure line or at a redundancy pressure port and which is configured to detect the pneumatic redundancy pressure at the redundancy pressure port and to provide a corresponding redundancy pressure signal at the control unit.

21. The electropneumatic control module as claimed in claim 20, wherein the redundancy pressure signal forms the brake representation signal.

22. The electropneumatic control module as claimed in claim 18, wherein the brake representation signal is provided by a further control unit.

23. A tractor vehicle having an electronic control module as claimed in claim 1.

24. An electropneumatic control module for an electronically controllable pneumatic brake system for a vehicle combination with a tractor vehicle and a trailer vehicle, the electropneumatic control module comprising:

a pneumatic reservoir input, which is connectable to a compressed-air reservoir, a trailer control unit, which has a trailer control valve unit with one or more electropneumatic valves, a trailer brake pressure port and a trailer supply pressure port, an immobilizing brake unit, which has a spring force actuator port for a spring force actuator, a spring force actuator configured to output a spring force to effectuate a parking brake force for a tractor vehicle, and an immobilizing brake valve unit with one or more electropneumatic valves, and an electronic control unit for controlling the trailer control valve unit and the immobilizing brake valve unit, wherein the trailer control unit has a first relay valve, which has a relay valve working input connected to the reservoir input, a relay valve output connected to the trailer brake pressure port, and a relay valve ventilation output, via which the relay valve output is connectable to a pressure sink, wherein the first relay valve has a relay valve control input, which opens into a common control chamber, wherein the relay valve control input is connectable by means of the trailer control valve unit to the reservoir input and/or to a ventilation means in order to output a service brake control pressure in the common control chamber, and wherein, in the event of a fault of the electropneumatic control module, a redundancy pressure can be output into the common control chamber in order to output a brake pressure at the trailer brake pressure port, and wherein the one or more electropneumatic valves of the trailer control valve unit include an electronically switchable inlet valve with at least one first and one second inlet valve port, wherein the first inlet valve port is connected to the reservoir input, and the second inlet valve port is connected to the control chamber of the first relay valve, in order to aerate the control chamber through switching of the inlet valve.

25. An electropneumatic control module for an electronically controllable pneumatic brake system for a vehicle combination with a tractor vehicle and a trailer vehicle, the electropneumatic control module comprising:
 a pneumatic reservoir input, which is connectable to a compressed-air reservoir,
 a trailer control unit, which has a trailer control valve unit with one or more electropneumatic valves, a trailer brake pressure port and a trailer supply pressure port,
 an immobilizing brake unit, which has a spring force actuator port for a spring force actuator, a spring force actuator configured to output a spring force to effectuate a parking brake force for a tractor vehicle and an immobilizing brake valve unit with one or more electropneumatic valves,
 an electronic control unit for controlling the trailer control valve unit and the immobilizing brake valve unit, and
 a redundancy pressure port with a first redundancy pressure line for the connection of a brake transducer or of a brake or control pressure of a tractor vehicle axle, via which redundancy pressure port a brake pressure can be output at the trailer brake pressure port,
 wherein the trailer control unit has a first relay valve, which has a relay valve working input connected to the reservoir input, a relay valve output connected to the trailer brake pressure port, and a relay valve ventilation output, via which the relay valve output is connectable to a pressure sink,
 wherein the first relay valve has a relay valve control input, which opens into a common control chamber,
 wherein the relay valve control input is connectable by means of the trailer control valve unit to the reservoir input and/or to a ventilation means in order to output a service brake control pressure in the common control chamber, and wherein, in the event of a fault of the electropneumatic control module, a redundancy pressure can be output into the common control chamber in order to output the brake pressure at the trailer brake pressure port, and
 wherein the one or more electropneumatic valves of the trailer control valve unit include an electronically switchable redundancy valve with at least one first and one second redundancy valve port, wherein the first redundancy valve port is connected to the redundancy pressure port, and the second redundancy valve port is connected via a second redundancy pressure line to the control chamber of the first relay valve, in order to output the redundancy pressure in the control chamber through switching of the redundancy valve.

26. An electropneumatic control module for an electronically controllable pneumatic brake system for a vehicle combination with a tractor vehicle and a trailer vehicle, the electropneumatic control module comprising:
 a pneumatic reservoir input, which is connectable to a compressed-air reservoir,
 a trailer control unit, which has a trailer control valve unit with one or more electropneumatic valves, a trailer brake pressure port and a trailer supply pressure port,
 an immobilizing brake unit, which has a spring force actuator port for a spring force actuator, a spring force actuator configured to output a spring force to effectuate a parking brake force for a tractor vehicle and an immobilizing brake valve unit with one or more electropneumatic valves, and
 an electronic control unit for controlling the trailer control valve unit and the immobilizing brake valve unit,
 wherein the trailer control unit has a first relay valve, which has a relay valve working input connected to the reservoir input, a relay valve output connected to the trailer brake pressure port, and a relay valve ventilation output, via which the relay valve output is connectable to a pressure sink,
 wherein the first relay valve has a relay valve control input, which opens into a common control chamber,
 wherein the relay valve control input is connectable by means of the trailer control valve unit to the reservoir input and/or to a ventilation means in order to output a service brake control pressure in the common control chamber, and wherein, in the event of a fault of the electropneumatic control module, a redundancy pressure can be output into the common control chamber in order to output a brake pressure at the trailer brake pressure port, and
 wherein no inverse relay valve is provided.

* * * * *